United States Patent [19]
Aotake et al.

[11] Patent Number: 5,687,160
[45] Date of Patent: Nov. 11, 1997

[54] OPTICAL RECORDING MEDIUM WITH LISTS HAVING PLAYBACK CONTROL INFORMATION

[75] Inventors: Hidenori Aotake; Yoshimasa Hosono; Toshimasa Mizunashi; Shuhei Nakada, all of Kanagawa, Japan

[73] Assignee: Sony Corporation, Tokyo, Japan

[21] Appl. No.: 500,998

[22] PCT Filed: Dec. 12, 1994

[86] PCT No.: PCT/JP94/02084

§ 371 Date: Aug. 8, 1995

§ 102(e) Date: Aug. 8, 1995

[87] PCT Pub. No.: WO95/16262

PCT Pub. Date: Jun. 15, 1995

[30] Foreign Application Priority Data

Dec. 10, 1993 [JP] Japan ..................... 5-310381

[51] Int. Cl.$^6$ ..................... G11B 7/24; H04N 5/76
[52] U.S. Cl. ..................... 369/275.3; 386/126
[58] Field of Search ..................... 369/275.3, 275.2, 369/58, 32, 47, 48, 54; 358/342, 343, 335; 386/126, 125, 124

[56] References Cited

U.S. PATENT DOCUMENTS

| | | | |
|---|---|---|---|
| 5,455,684 | 10/1995 | Fujinami et al. | 358/335 |
| 5,497,241 | 3/1996 | Ostrover et al. | 358/341 |
| 5,504,585 | 4/1996 | Fujinami et al. | 358/335 |

FOREIGN PATENT DOCUMENTS

| | | |
|---|---|---|
| 2-165220 | 6/1990 | Japan . |
| 2-214924 | 8/1990 | Japan . |
| 4-196779 | 7/1992 | Japan . |

OTHER PUBLICATIONS

Nikkei Electronics, Nov. 8, 1993 (No. 594) Japanese language catalog pp. 169–174 with English language translation.

*Primary Examiner*—Tan Dinh
*Attorney, Agent, or Firm*—Limbach & Limbach LLP

[57] ABSTRACT

An information recording medium with recorded picture information and/or the speech information is made up of plural lists at least a portion of which record item information and playback control information. The item information indicates the one or plural items reproduced based upon the list, while the playback control information contains a pointer represented by an offset from the leading end of the playback control information indicating a connection to a separate list. An information reproducing apparatus when reproducing the picture information or the like from the information recording medium reproduces the picture information or the like from the picture recording medium responsive to the information selected under instructions by the user from among the playback control information data reproduced from the information recording medium. The information designated by the user may be reproduced or accessed easily.

23 Claims, 19 Drawing Sheets

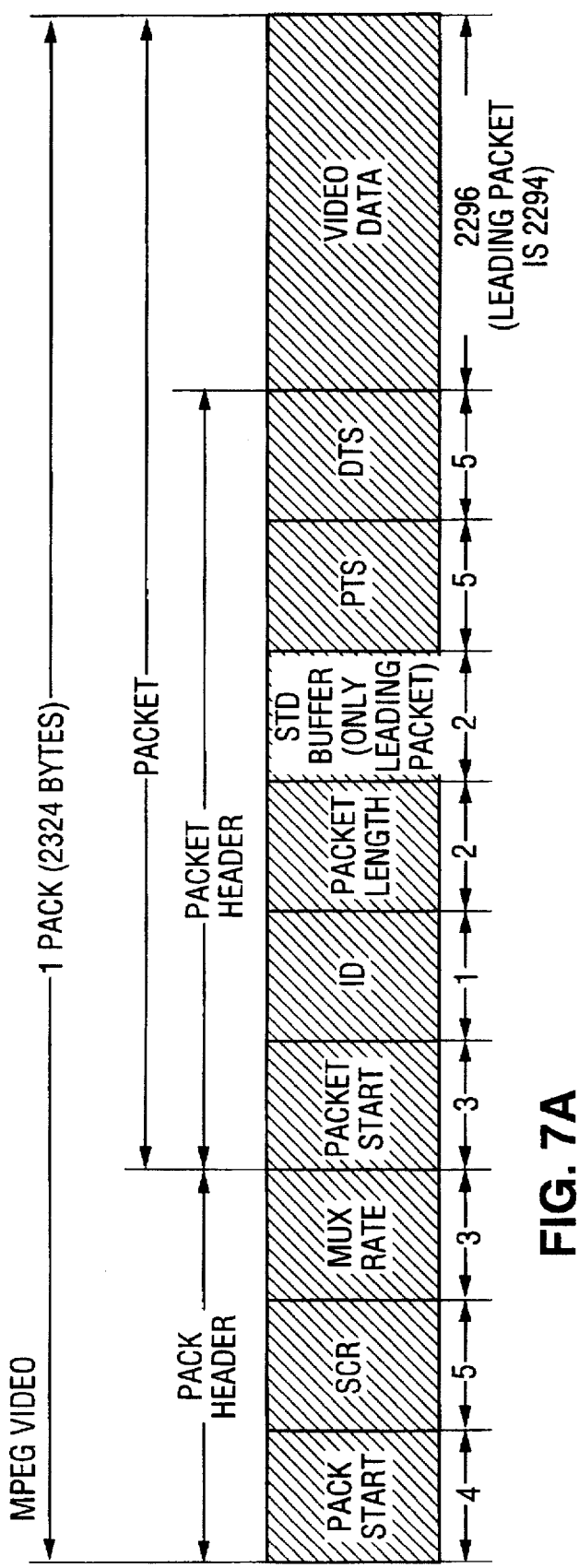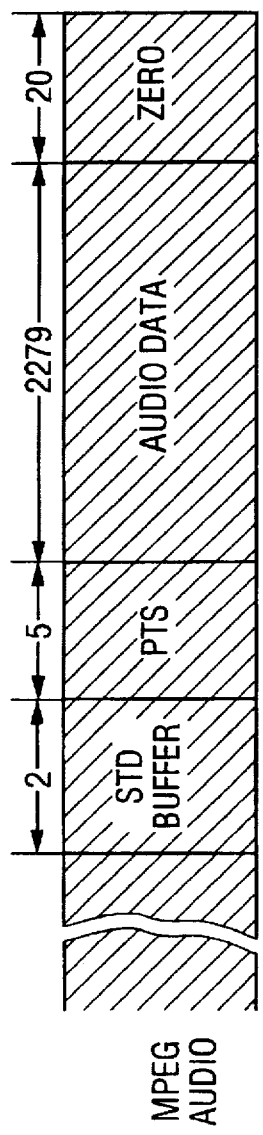
FIG. 7A
FIG. 7B

OPTICAL RECORDING MEDIUM WITH LISTS HAVING PLAYBACK CONTROL INFORMATION

TECHNICAL FIELD

This invention relates to an information recording medium applied to e.g. a CD-ROM or CD-I which are read-only memories employing so-called compact discs and an information reproducing apparatus for reproducing the information supplied by the information recording medium, such as the CD-ROM or CD-I.

BACKGROUND ART

One information recording media is a compact disc comprised of an optical disc having audio signals recorded thereon, that is a compact disc-digital audio (CD-DA).

However, with the CD-DA, referred to hereinafter as audio CD, sound-only data is recorded on a unit termed a track, so that it is not possible to record the program or script controlling the playback function.

On the other hand, only the linear reproduction or the reproduction in the sequence designated by the user is carried out, such that there is not the degree of freedom even if the purveyor of the contents intend to reproduce signals in an alternative sequence.

On the other hand, it is possible with the so-called CD-I (CD-Interactive) to handle the sound, moving pictures or still pictures as data files.

However, data accessing is performed through a file system and is complex.

Although complex operations may be achieved depending on program types, since the program is a code depending on the player's CPU (central processing unit), there exist a large number of hardware-related limitations, while the program itself is difficult to formulate.

DISCLOSURE OF THE INVENTION

In view of the foregoing, it is an object of the present invention to provide an information recording medium which is capable of recording data of moving pictures still pictures or speech as a data file, which suffers from fewer limitations with respect to the hardware for reproduction and which is capable of rendering the data recorded on the hardware accessible for reproduction. It is a further object of the present invention to provide an information reproducing apparatus for reproducing the information recording medium.

The present invention has been proposed for achieving the above object. The information recording medium has recorded thereon the picture information or the speech information. A plurality of items including picture information and/or speech information and playback control information for controlling the reproduction of the items are recorded on the recording medium. The playback control information is made up of plural lists. At least some of the lists include the item information indicating one or a plurality of items reproduced in accordance with the lists and a pointer representing the offset from the leading end of the playback control information indicating a separate list connected to the lists.

An information reproducing apparatus for reproducing an information recording medium having recorded thereon picture information or speech information. A plurality of items composed of the picture information and/or the speech information and the playback control information for controlling the reproduction of the items are recorded on the recording medium. The playback control information is made up of plural lists. At least some of the lists include the item information indicating one or a plurality of items reproduced in accordance with the lists and a pointer representing the offset from the leading end of the playback control information indicating a separate list connected to the lists. The apparatus includes reproducing means for reproducing the information recorded on the information recording medium, input means for inputting the user's selection, and output means for outputting the picture information and/or the speech information reproduced by the reproducing means. The apparatus further includes control means for controlling the reproduction of the respective items by the reproducing means based upon the item information in a predetermined list of the playback information reproduced by the reproducing means. The control means causes switching of the list of interpretation based on the pointer when the user's selection is entered by the input means or reproduction of all items indicated in said predetermined list comes to an end.

In the information recording medium according to the present invention, a plurality of items and playback control information including a plurality of lists are recorded. Since item information and a pointer are described at least in some of the lists, the item to be reproduced on the basis of a predetermined list can be specified from the plurality of items according to the item information described in the predetermined list. Also, control can be transferred to another list as specified by the pointer described in the predetermined list.

With the information reproducing apparatus of the present invention, the reproducing means reproduces the playback control information comprised of plural lists from the information recording medium, and the control means interprets the item information stated in a predetermined list in the reproduced playback control information for controlling the reproduction of each item. Each reproduced item is outputted by the outputting means. When the reproduction of each item indicated in the preset list or selected and entered by the user via the input means comes to a close, the control means switches the list to be interpreted responsive to the pointer stated in each list in order to permit interpretation of the new item information. In this manner, required items are sequentially reproduced and outputted responsive to the user's request.

BRIEF DESCRIPTION OF THE DRAWINGS

FIGS. 7A and B shows a sector format of MPEG video data recorded on the disc of the present embodiment.

BEST MODE FOR PRACTICING THE INVENTION

Figure 1:
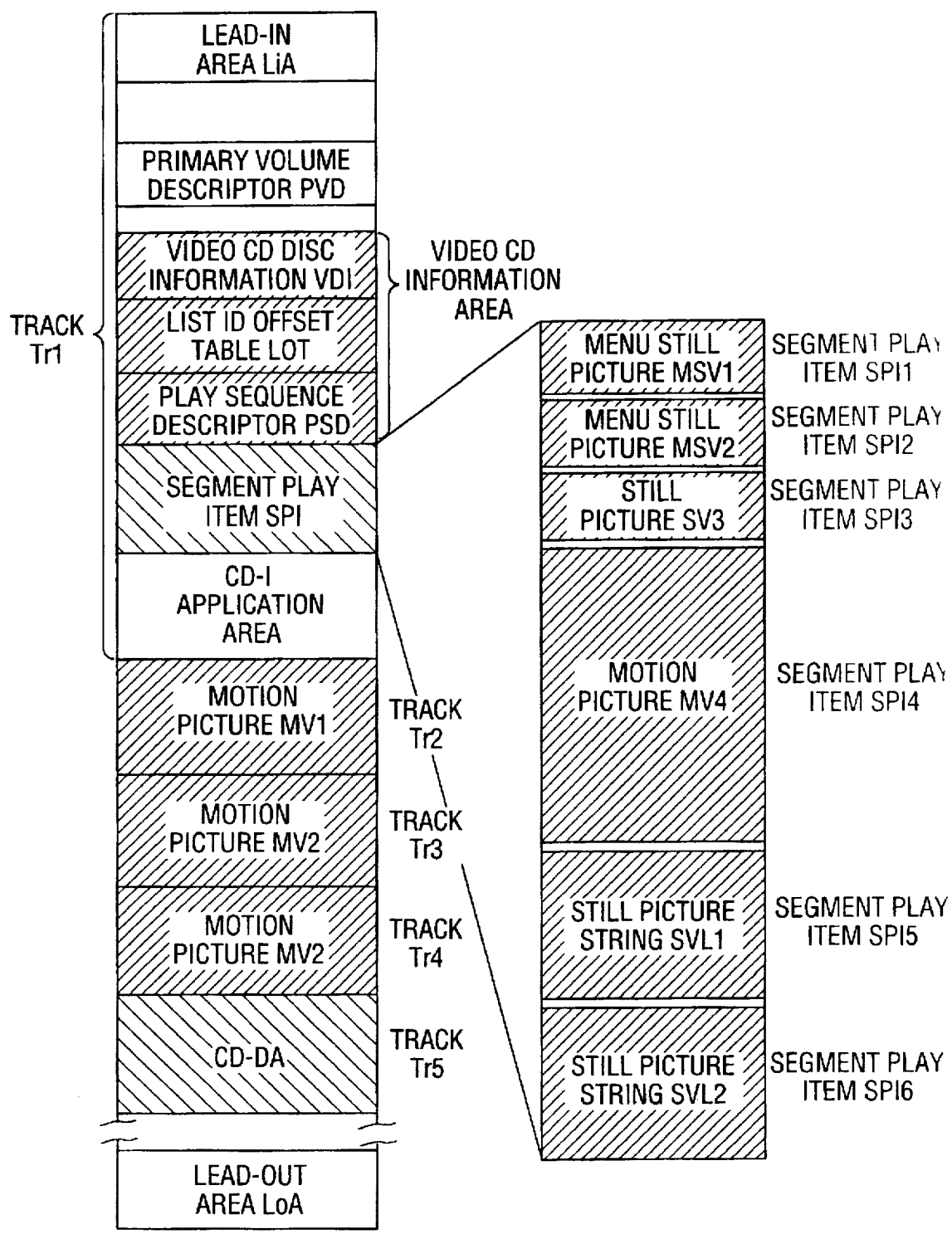
FIG. 1 illustrates a track array on a disc as an information recording medium of the present embodiment for recording the playback control information.

Referring to the drawings, preferred embodiments of the present invention will be explained in detail.

An information recording medium of the present embodiment has recorded, for example, segment play items SPI such as menu still pictures MSV1 and MSV2 still picture SV3, motion pictures MV1, MV2, MV3 and CD-DA as plural items. The information recording medium also has recorded a play sequence descriptor PSD as playback control information, as shown in FIG. 1. The play sequence descriptor is made up of a selection list SL, a play list PL, an end list EL, a change volume list CL and a change volume list type 2, as will be explained subsequently.

The selection list SL, which is the first list, includes a play item offset as a sole item information. The selection list SL also includes a next list offset, previous list offset and a cancel list offset, as first, second and third pointers, respectively, while also including a selection #n offset as plural pointers branching responsive to the user selection. The selection list SL also includes a wait for time-out as later explained.

On the other hand, the play list PL3 which is the second list, includes the play item #n offset as the item information, while including the next list offset, previous list offset and cancel list offset, as first, second and third offsets, respectively. The play list includes the wait time, as later explained, as the information indicating the wait time.

Each offset expresses plural bytes as one unit.

The end list, which is the third list, indicates the end of interpretation of the play sequence descriptor PSD.

The play sequence descriptor PSD includes the change volume list or the change volume list type 2, as the information for exchanging and reproducing plural information recording media.

The information recording medium of the present embodiment includes data, as later explained, as the information indicating the attributes of the respective items. The video CD disc information VDI of FIG. 1 includes the PSD size, for example, as the information indicating the size of the play sequence descriptor PSD.

The information recording medium of the present embodiment has recorded thereon list ID offset data (LOT) as a table for relating the identification codes of the respective lists with the associated offsets, as shown in FIG. 1.

The play sequence descriptor PSD is information which is non-dependent on the object code and the operating system of a micro-computer. Meanwhile, the information recording medium of the present embodiment is comprised of an optical disc and within the category of CD-ROM information recording media.

In the present embodiment, the video data and the audio data, and data excluding the video and audio data, are given as examples, as later explained. The video data is recorded e.g. on tracks Tr2 to Tr4 and on segment play item SPI1 to SPI6 in the segment play item SPI, while the audio data is recorded in a track Tr5. The data excluding the video data and the audio data is exemplified by a video CD disc, information VDI, list ID offset table LOT and play sequence descriptor PSD.

Figure 2:
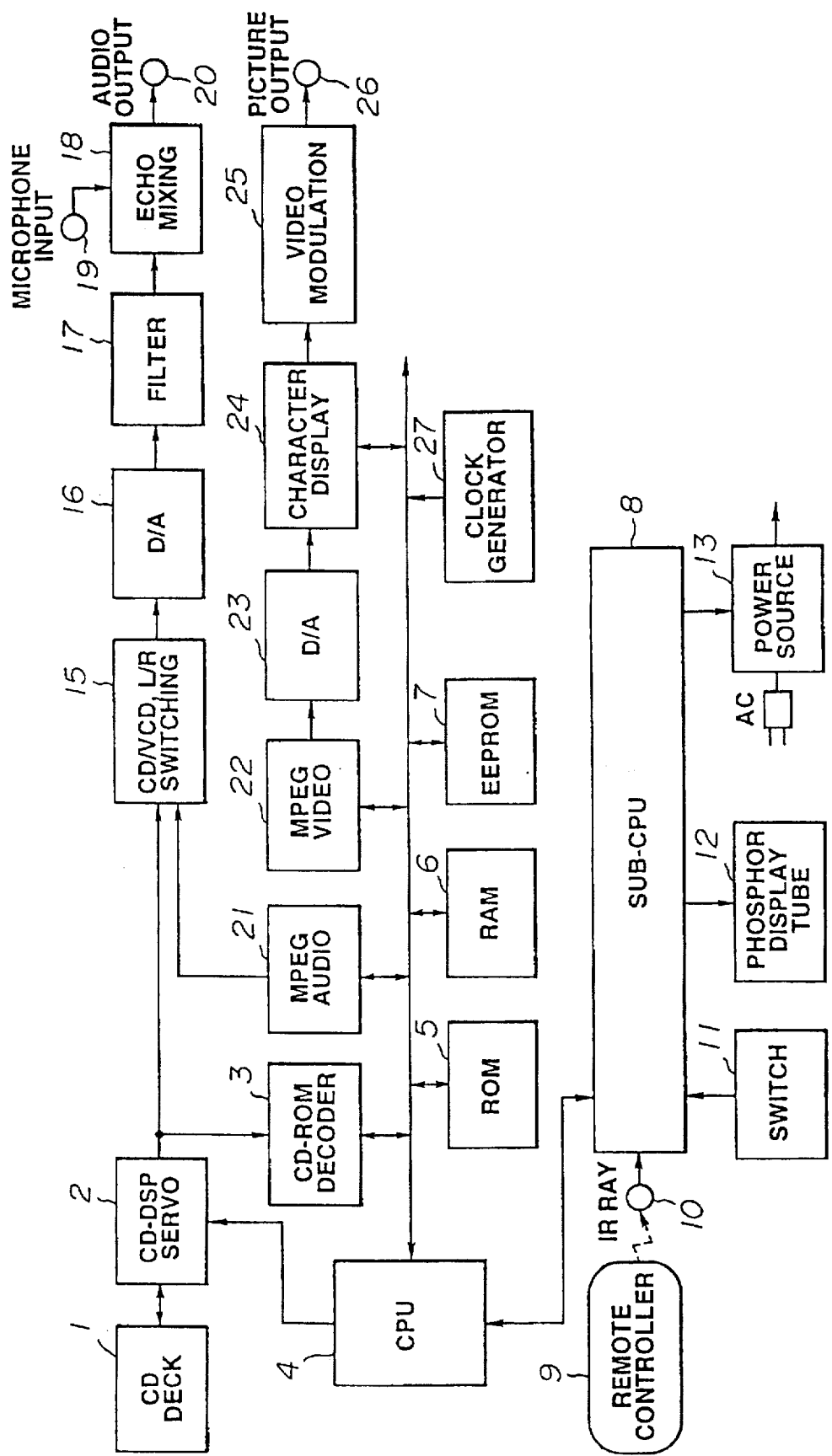
FIG. 2 is a schematic block circuit diagram showing the construction of an information reproducing apparatus embodying the present invention.

FIG. 2 shows a construction of an information reproducing apparatus embodying the present invention.

The information reproducing apparatus of the present embodiment reproduces an optical disc of the present embodiment (referred to hereinafter as a video CD) on which there are recorded plural items made up of moving pictures MV1 or MV2 (video data) and/or audio information (audio data) such as CD-DA, and the playback control information for controlling the reproduction of the plural items. At least a portion of the plural lists includes the item information indicating one or more items which are to be reproduced based upon the list and a pointer expressed by the offset from the leading end of the playback information indicating another connected list. The information reproducing apparatus includes a CD deck 1 as reproducing means for reproducing the information from the video CD of the present embodiment, a remote controller 9 and/or a switch 11 as inputting means for inputting the information of a user selection, an MPEG video decoder 22 and a D/A converting circuit 23 as means for outputting the reproduced picture information, an MPEG audio decoder 21 and D/A converting circuit 18 as outputting means for outputting the reproduced speech information and a central processing unit (CPU) 4 as control unit, as shown in FIG. 2. The CPU 4 controls the playback of the respective items by the CD deck 1 based upon the item information in the predetermined list in the playback control information and, when the user's selection is entered by the remote controller 9 or the switch 11 or the reproduction of the total items shown in the predetermined list is finished, the CPU 4 switches the interpreting list based upon the above pointer.

The above offsets in the optical disc (video CD) of the present embodiment are expressed in terms of plural bytes as one unit. In addition, the information reproducing apparatus of the present embodiment has a RAM 6 as storage means for storing at least a portion of the reproduced playback control information.

The playback control information is the information which is not dependent on the operating system and the object code of the CPU 4 loaded on the information reproducing apparatus of the present embodiment. Thus the information reproducing apparatus of the present embodiment stores in a ROM 5 the program required for conversion of the non-dependent information for coping with the operating system and the object code of the CPU 4.

The CPU 4, for example, of the information reproducing apparatus of the present embodiment, also acts as a timing measurement means for measuring the time based upon reference clocks from a clock generator 27. Thus the CPU 4 will interprets an another playback control information when detecting that there is no input from the remote controller 9 or the switch 11 after lapse of a pre-set time (time-out as later explained). Meanwhile, the clock generator 27 also acts as the above-mentioned timing measurement means, in which case the information indicating the lapse of the above pre-set timing is routed to the CPU 4.

Before proceeding to detailed description of the construction shown in FIG. 2, the contents of the present invention will be explained.

Figure 3:
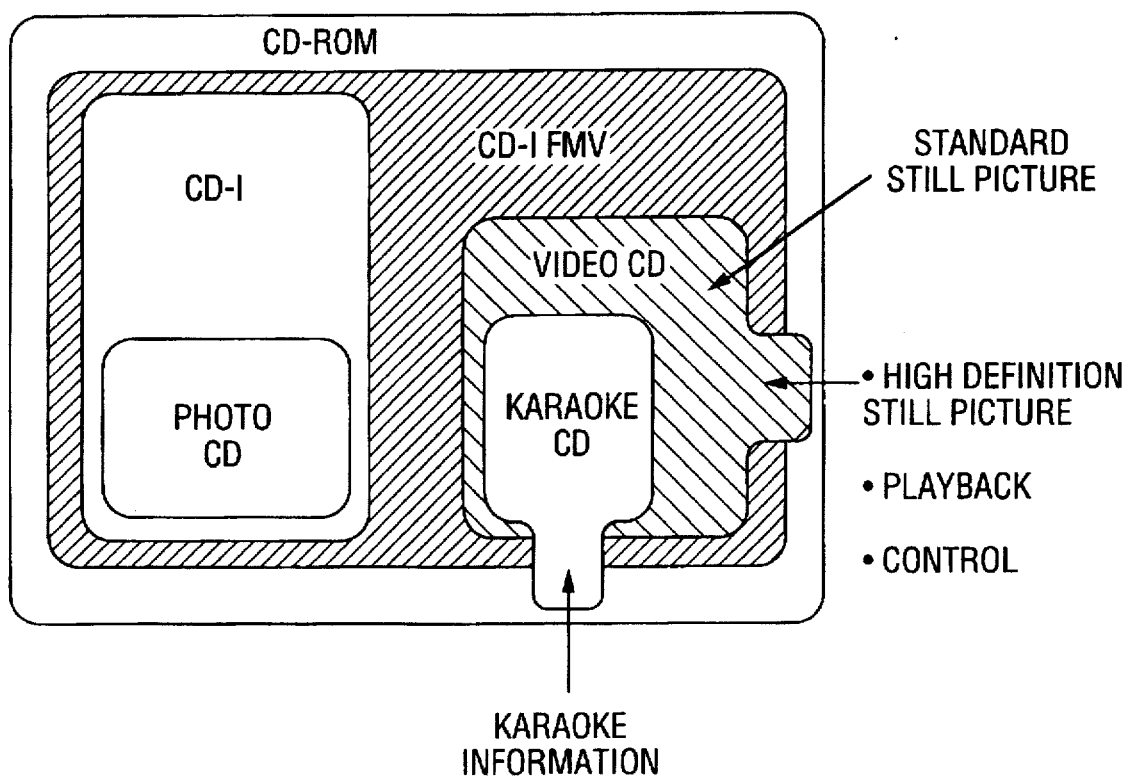
FIG. 3 illustrates the standard for the CD-ROM and that of the disc of the present embodiment by way of comparison.

A variety of standards are prescribed for the so-called compact disc (CD) depending on the types of recorded data. That is, the CD standards are roughly classified into audio CD (CD-DA) for recording audio signals, and CD-ROM for recording various data, as shown in FIG. 3. Of these, the format for the optical disc (video CD), which is the information recording medium of the present embodiment for recording video signals, is included in the category of the CD-ROM, and represents extension of the so-called karaoke CD (CD animated picture karaoke) aimed at reproducing a moving picture in simplified manner. The karaoke CD herein means an optical disc mainly used in a karaoke in which input audio signals from a microphone and music signals are mixed together.

The field of the household software is broad and includes not only simplified moving picture reproduction but also music software, education software in which publication software in which the moving picture and the still picture are combined together. For coping with these kind of softwares, the design statements for a high definition still picture of 704×480 pixels and the function of playback control for realization of menu reproduction, such as are shown in Table 1, are included on the optical disc (video CD) of the embodiment of the present invention.

TABLE 1

| Physical Format | CD-ROM (XA) |
| --- | --- |
| Digital Video | Pursuant to MPEG1<br>Pixel Size/Frame Frequency:<br>352 × 240/29.97 Hz (NTSC)<br>352 × 240/23.976 Hz (film)<br>352 × 288/25 Hz (PAL)<br>Data Transfer Rate:<br>Max. 1.152 Mbits/sec<br>Video Pack: 2296 bytes |
| Digital Audio | MPEG Layer 2<br>Sampling Frequency: 44.1 kHz<br>Data Transfer Rate: 224 kbits/sec<br>Audio Pack: 2279 bytes |
| Reproducing Time | Max. 74 min. |
| Number of Pixels of Still Picture | Standard Level: 352 × 240<br>High Definition Level: 704 × 480 |
| Playback Design Statements | Menu Reproduction Employing Playback Control, such as, Normal Playback, Slow, Pause |
| Video Signal Output | NTSC/PAL |
| Field of Application | Motion Picture, Karaoke, Music, Education, Photoalbum, etc. |

In addition, the recording format for the optical disc (video CD) of the present embodiment is a format compatible with the existing CD-I FMV (full-motion video). That is, the recording format for the video CD of the present embodiment is the bridge standard capable of being reproduced on a player capable of coping with the CD-I FMV standard and maintains standard integration and optical disc compatibility.

Since the optical disc (video CD) of the present embodiment does not specify an operating system, unlike the CD-I, it can be exploited on a game machine or a personal computer having loaded thereon a moving picture board for MPEG (moving picture expert group) for compaction coding of a moving picture.

With the optical disc (video CD) of the present embodiment, data of the information portion as computer data is pursuant to form 1 of the CD-ROM format, while audio or video data is pursuant to form 2 thereof and file management follows ISO9660. The video CD recording area is roughly comprised of a lead-in area LiA, a data area (tracks Tr1 to Tr99) and a lead-out area LoA, as shown in FIG. 1.

With respect to the CD-ROM XA format, the optical disc (video CD) of the present embodiment shown in FIG. 1 provides an area for recording the video CD disc information VDI, referred to hereinafter as video CD information portion, in a video CD information area. It is in this video CD information portion that a variety of the optical disc information data are recorded. In addition, there is provided in the video CD information portion of the track Tr1 an area for recording a list ID offset table LOT, referred to hereinafter as list ID offset table portion. In this list ID offset table portion, the identification information (ID) for the moving picture and the still picture recorded on the optical disc stored. On the other hand, an area for recording the play sequence descriptor PSD, referred to hereinafter as a playback control portion, is provided in the video CD information area. In this video CD information area, there is recorded the play sequence described in a list form.

In the segment play item SPI, data that can be used for a menu picture, such as a still picture, is adapted to be written. In the embodiment of FIG. 1, the segment play item SPI is made up of segment play items SPI1 to SPI6. In the segment play items SPI1 and SPI2, the menu still pictures MSV1 and MSV2 are written. In the segment play item SPI3, the still picture SV3 is written. Similarly, in the segment play item SPI4 and in the segment play items SPI5 and SPI6, the motion picture MV4 and still picture strings SLV1 and SLV2 are written, respectively.

In the track Tr1, there is arrayed a CD-I application area. For reproducing the optical disc of the video CD format of the present embodiment on a CD-I FMV player, the player first reads the area and reproduces the disc in accordance with the application procedure. For reproducing the disc with an equipment in need of directory control such as a personal computer, file management is made in accordance with directory management shown in FIG. 4.

Figure 4:
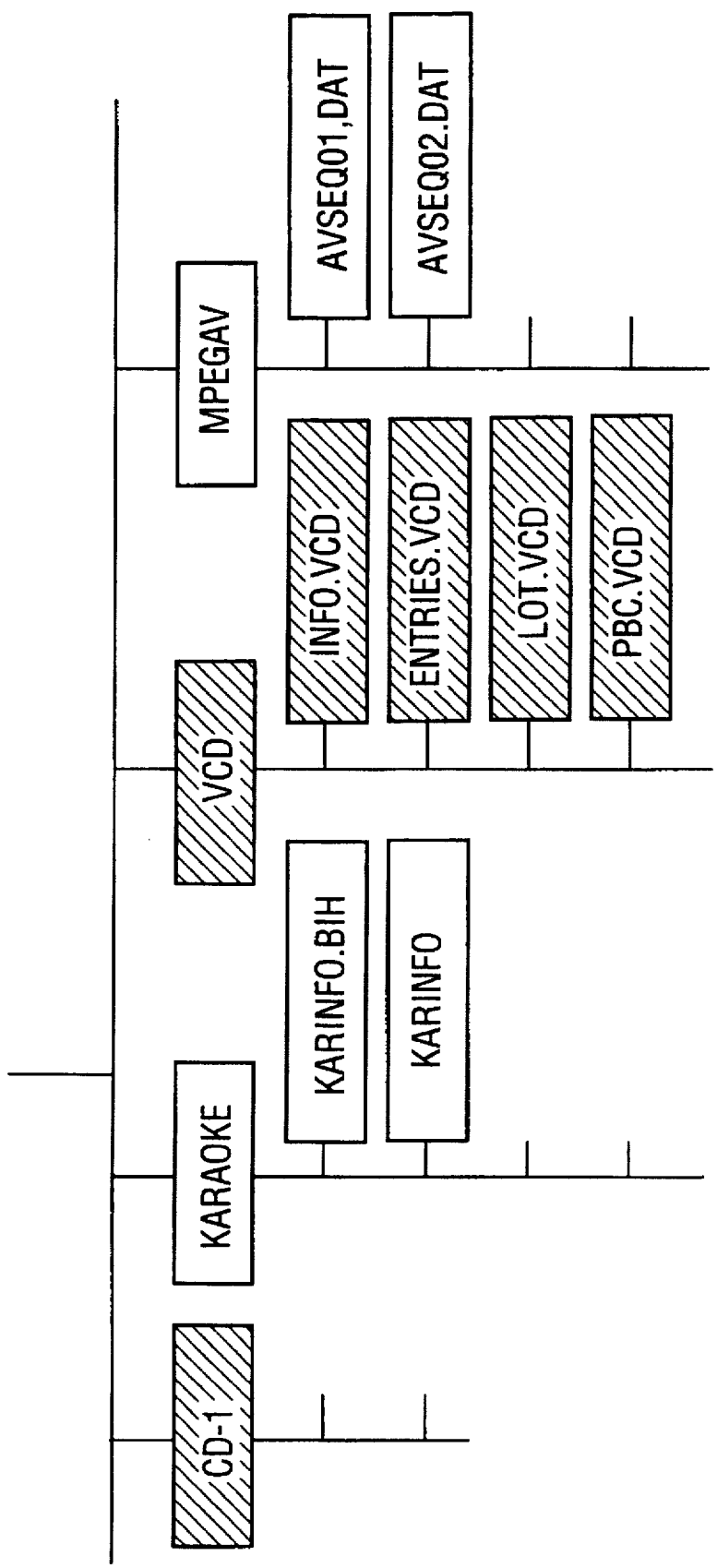
FIG. 4 illustrates the disc directory constitution.

That is, the directory of the video CD indicated as VCD in FIG. 4 is added to the conventional directory constitution consisting of CD-I, MPEG audio and video and karaoke, as shown in FIG. 4. In the directory of FIG. 4 for the video CD, the information for the video CD is stored in INFO.VCD. In the Directory for the VCD in FIG. 4, for example, the video VCD information is stored in INFO.VCD, while a start position of a moving picture and audio data of the MPEG standard is stored in ENTRIES VCD. In the LOT.VCD and PBC.VCD, a lot ID offset table LOT and the playback control information are stored, respectively.

The ordinary MPEG data is recorded at track Tr2 and subsequent tracks. Thus, the ordinary MPEG data can handle by up to a maximum of track 99. It is noted that, with the recording format for the optical disc (video CD) of the present embodiment, not only the simplified interruptive software taking advantage of the playback control but also an optical disc for reproducing a high definition still picture using only the track Tr1 can be realized.

In the example of FIG. 1, data for the moving pictures MV1 to MV8 and data for the CD-DA are recorded on the tracks Tr2 to Tr4 and on a track Tr5, respectively.

Figure 5:
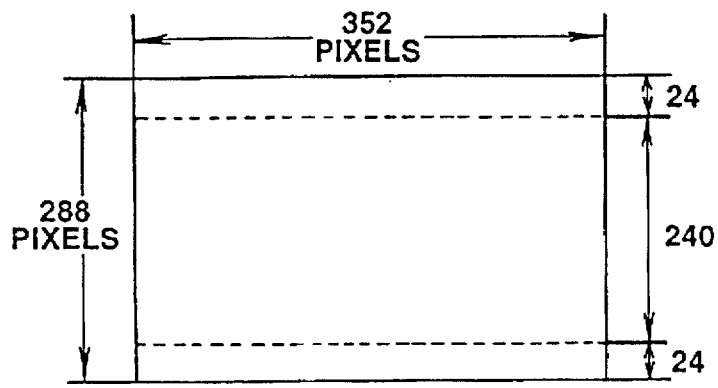
FIG. 5 illustrates the screen size fixed in the present embodiment.

Next, the recording format for the video signal (data) and audio signals (data) for the optical disc of the present embodiment conforms to MPEG1. About 1.2 Mbits per second and about 0.2 Mbits per second are allocated to the video data and to the audio data, respectively. The screen size for the picture is 352 by 240 pixels for NTSC signals (30 Hz) and motion picture films (24 Hz). The screen size is 352 by 288 pixels for the PAL signals (25 Hz), as shown in FIG. 5. The MPEG layer 2 is used as a format for audio data. The MPEG 2 audio data accommodates a wide range of the coding rate of 32 kbits per second to 448 kbits per second. In the present embodiment, the encoding rate is limited to 224 kbits per second in view of simplified software formulation and high sound quality. Meanwhile, the playback mode is stereo (2 channel) mode so that, for example, the channel 0 and channel 1 may be allocated to music and to music and singer's songs, respectively, for karaoke software applications.

Figure 6:
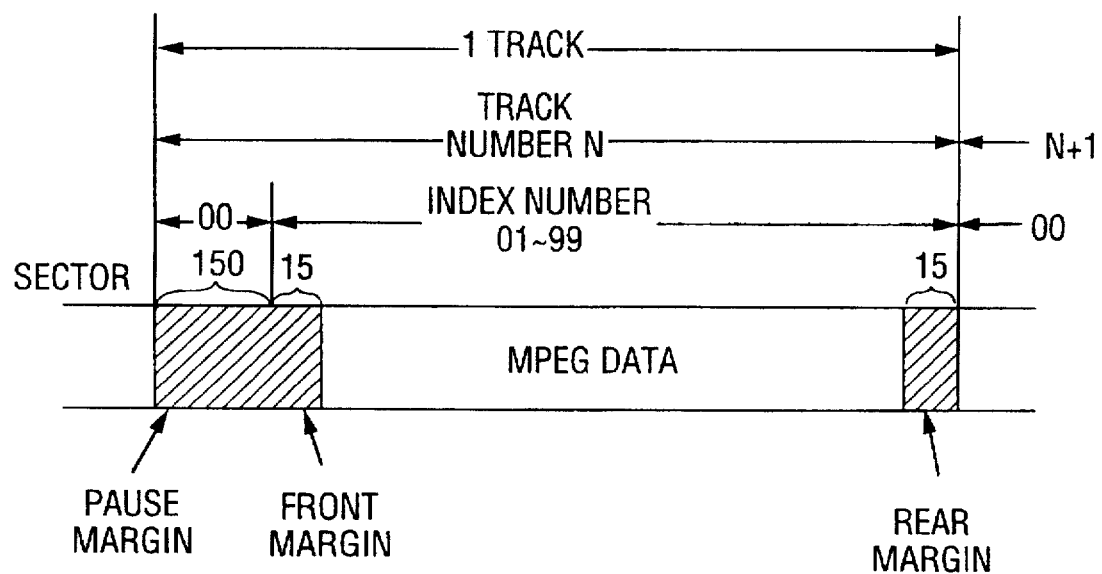
FIG. 6 illustrates the track constitution of the disc of the present embodiment.

FIG. 6 shows a track constitution of the optical disc (video CD) of the present embodiment. That is, the MPEG video data and audio data are recorded in an interleaved fashion on the optical disc. The video and audio data are recorded at a ratio of 6:1 on an average. On the assumption that track number retrieval may be made as in a conventional CD player, 150 sectors are set for a pause margin, while 15 sectors each are set for a front margin and a rear margin, respectively, in order to diminish the effect on a bitstream on retrieval.

The sector format for the MPEG video data is comprised of a pack made up of a pack header and pack data, as shown in FIG. 7A. Each pack is made up of 23244 bytes representing a 1-sector user data area of the CD-ROM. In FIG. 7, PTS, DTS, SCR and STD denote a presentation time stamp, a decoding time stamp, a system reference clock and a system target decoder, respectively.

The sector format of the MPEG audio data, as shown in FIG. 7B, is basically the same as that of the video data. However, 12 bytes, 13 bytes and 2279 bytes are allocated to the pack header, packet header and to the data portion, with the 2304 bytes as one pack, to which excess 20 bytes (20 zeros) are appended so that the resulting 2324 bytes make up one pack in the case of video data.

In the present embodiment, the dialogue type playback consisting in a combination of a moving picture and a still picture is realized by the following playback control function. In the following description, the playback control function is also referred to as the play sequence descriptor function. The play sequence descriptor function includes, as main functions, a play list PL and a selection list SL, as later explained. The play list PL and the selection list SL describe the sequences of moving picture reproduction and menu reproduction, respectively. For accessing a desired moving picture data or still picture data in accordance with the playback control function, reference is had to the addresses of the still picture and the moving picture stored in the list ID offset table LOT. The control data volume for realizing the playback control (play sequence descriptor) function is on the order of a maximum of 512 kbytes, as will be explained subsequently.

Next, the data handled with the optical disc (video CD) of the present embodiment (video data, audio data and data of the video CD information area) is explained.

The video data is data for a moving picture of the usual definition size (352×240/288) and data for a still picture of the high definition size (704×480/576). When the data for the still picture with high definition is recorded, data for the still picture of the same image with the usual definition is recorded on the recording medium.

The sub-header of each data is defined as shown for example in Table 2.

TABLE 2

| | File # | Channel # | Submode | Coding Information |
|---|---|---|---|---|
| Moving Picture | xx | $01 | %x11x001x | $0F |
| Normal Definition Still Picture | xx | $02 | %x11x001x | $1F |
| High Definition Still Picture | xx | $03 | %x11x001x | $3F | where $ and % denote hexadecimal number and binary numbers, respectively.

The audio data of may include audio data up to two channels. The two channels are termed main channel/sub-channel. The main channel is necessarily inserted when inserting the sub-channel. The sampling frequency is fixed at 44.1 kHz. Five bit rates are used, namely 64, 128, 192, 224 and 384 kbits for the stereo/intensity stereo/dual channel, while four bit rates are used, namely 32, 64, 96 and 192 kbits for the monaural channel.

The sub-header for each data is prescribed as shown in Table 3.

TABLE 3

| | File # | Channel # | Submode | Coding Information |
|---|---|---|---|---|
| Main Channel | xx | $01 | %x11x010x | $7F |
| Sub-Channel | xx | $02 | %x11x010x | $7F |

The data for the video information area includes the video CD disc information VDI, list ID offset table LOT and the play sequence descriptor PSD as data files.

These sub-headers are prescribed as shown for example in Table 4.

TABLE 4

| | File # | Channel # | Submode | Coding Information |
|---|---|---|---|---|
| Data File | $00 | $00 | %X00x100x | $00 |

The construction of the video CD disc information VDI shown in FIG. 1 is explained. The video CD disc information VDI is fixedly stored at a sector "00:03:00". In this sector is stored the basic information of the video CD.

The contents are as shown in Table 5.

TABLE 5

| Position (Byte Position: BP) | Summary | Contents | Size |
|---|---|---|---|
| BP 1–8 | ID String | "VIDEO-CD" | 8 bytes |
| BP 9–10 | Version No. | $0100 | 2 bytes |
| BP 11–18 | Disc ID |  | 8 bytes |
| BP 19–22 | PSD Size |  | 4 bytes |
| BP 23 | Offset Base | 8 (Fixed) | 1 byte |
| BP 24 | Reserved | $00 | 1 byte |
| BP 25–26 | Number of List ID |  | 2 bytes |
| BP 27–154 | Disc Title |  | 128 bytes |

The ID string denotes a character string for ID for identification of the video CD, while the version number (version No.) denotes the version number for the video CD. The disc ID and the PSD size denote the ID number proper to the optical disc and the size (byte number) of the play sequence descriptor PSD, respectively. The PSD size of 0 indicates an optical disc devoid of the play sequence descriptor PSD. The offset base denotes the base of the offset employed in the play sequence descriptor PSD. It is fixed at 8 in Version 1. The offset is multiplied by the base, which is 8, for calculating the address. The number of list ID (num. of list ID) and the disc title denote the number of IDs written in the list ID offset table LOT and the title of the optical disc, respectively.

The construction of the list ID offset table LOT shown in FIG. 1 is explained. The location where the list ID offset table LOT is stored is fixed at a sector 00:03:01–"00:03:32".

The list ID offset table LOT is a table showing the list ID attached to the selection list SL and the play list PL with respective offsets. If the user directly designates the ID, start can be made at the moving picture (play list) or the menu (selection list) associated therewith. If the user designates the ID and causes only one sector containing the ID offset to be read out, it can be known from which point the list is to be followed. That is, the list ID offset table LOT is data that is not required to be put in the memory during ordinary playback. If, during playback of the play list PL and the selection list SL, the list ID is displayed in a display tube of a player, such as a track number, it is possible for the user to memorize the number if he or she desired to view the menu or the moving picture from the outset and to designate the number (list ID) at a later time for re-check from the first portion of the list. If there are many list IDs, a maximum of 32 sectors are required for the list ID offset table LOT.

In the version 1, a maximum number of sectors are set aside. The ID offsets not in use are stuffed with zeros. The maximum number of 32 sectors is used because at least 14 bytes are required for one play list PL and, if it is expressed by offset values, it is stored in two offsets (16 bytes). If the entire range that can be expressed by 2-byte offsets (64 k offsets) is the play list PL, since there is left up to a maximum number of 32 k lists IDs, it suffices if a maximum of 32 k area (64 kbytes=32 sectors) is procured.

The list ID offset table LOT as the sector addresses has a value shown for example in Table 6.

TABLE 6

| "00:03:01" | Setup Offset | $0000 2 bytes |
|---|---|---|
|  | List ID1 Offset | $xxxx 2 bytes |
|  | List ID2 Offset | $xxxx 2 bytes |
|  | List IDN Offset | $xxxx 2 bytes (Num. of List ID = N) |

TABLE 6-continued

| "0:03:32" | Non-used List ID | $0000 2 bytes |
|---|---|---|
|  | Non-used List IS | $0000 2 bytes (Last of "00:02:32") |

The construction of the play sequence descriptor PSD is explained.

The location where the play sequence descriptor PSD is stored in the sector "00:03:33" (Max "00:06:63"). In this location are put the actual play list PL, selection list SL, play item PI, selection table and end list. At the leading end are put a play list PL reproduced first or a selection list SL. The maximum allowable size for the play sequence descriptor PSD is 512 kbytes, that is, 2 byte offset (64 k)×offset base (8)=512 kbytes=256 sectors=3 sec 31 frames. It suffices to read out and reproduce only a necessary portion (e.g., RAM 6 of FIG. 6). If there is memory capacity allowance, it suffices to store the entire play sequence descriptor PSD in a memory during, e.g. loading of the optical disc.

The construction of the play list PL, play item PI, selection list SL, selection table and end list, making up the play sequence descriptor PSD, will be explained in detail. To explain a term, the offset means the address information indicating the position where a list, for example, is stored, that is a location as counted from the leading end when the play sequence descriptor PSD in its entirety is virtually put in the memory. As explained in connection with the offset base of the video CD disc information VDI, 1 offset corresponds to 8 bytes. It is expressed by 16-bit binary (bi-level values).

The play list PL is now explained.

The play list describes a sequence of reproduction not containing branching.

The construction of the play list PL is shown for example in Table 7.

TABLE 7

| Play Last Header: PLH | 1 byte |
|---|---|
| Number of Play Items: NOI | 1 byte |
| Last ID Number: IDN | 2 bytes |
| Previous List Offset: PLO | 2 bytes |
| Next List Offset: NLO | 2 bytes |
| Cancel List Offset | 2 bytes |
| Wait Time | 1 byte |
| Reserved | 1 byte |
| From Play Item #1 Offset To Play Item #end Offset | 2 bytes each |

The play header PLH is a header indicating the play list ($10).

The number of play item NOI denotes the number of items described in the play list PL and is expressed by the binary (bi-level value).

The list ID number IDN identifies the list. By displaying the number on the screen or an indicator of a phosphor display tube 12 of FIG. 2, the user is apprised of the position of the list currently reproduced. It is possible for the user to start reproduction at an optional list by the direct list number selection function of the player. This is a so-called chapter select function. If the list does not permit direct access in accordance with the intention of the software producer, the list ID number is set to 0. At this time, no list ID number is displayed on the player, or a previous list ID number is displayed. The play list PL put on the offset $0000 or the selection list SL is set to $01.

The previous list offset PLO indicates the offset where a list to which processing is transferred when using the previous function is stored. If no previous function is required, $FFFF is set.

The next list offset NLO denotes the offset where there is stored a list to which processing is transferred on completion of execution of all the items or on employing the next function. If no next function is required, $FFFF is set.

The cancel list offset denotes the offset in which there is stored a list to which processing is transferred when employing the cancel function. If no cancel function is required, $FFFF is set.

The wait time registers the wait time after execution of one item. Since only one wait time can be set within the same play list PL, it is necessary to modify the play list PL if it is desired to modify the wait time. The LSB of the wait time corresponds to 0.5 sec. The wait time of $00 and $01 denotes that no waiting is made after reproduction and waiting for 0.5 second after reproduction before reproduction of the next item, or processing is transferred to the next list on completion of the total items, respectively.

$FF indicates waiting until the user's action.

The play item #n.offset (play item #n offset) denotes the offset of the item to be reproduced. The maximum value of n corresponds to the number of play item NOI.

The play item PI states the portion and contents on the optical disc of respective items composed of video/audio bitstream.

The construction of the play item PI is as shown for example in Table 8.

TABLE 8

| Item Start Sector Number | 3 bytes |
|---|---|
| Item End Sector Number | 3 bytes |
| File Number | 1 byte |
| Data Contents | 1 byte |

The item start sector number of the play item PI denotes the leading sector number where the bitstream is stored and is represented by binary coded decimal system.

The item end sector number denotes the last sector number where the bit stream is stored, and is stated by the binary coded decimal system. If the total sectors cannot be accessed during item playback due to fast feed reproduction, overrunning can be inhibited if the end boundary is known.

The file number designates the file number of data stored on the optical disc. The file number corresponds to the value of the sub-header of the form 1 and 2 sectors.

The data contents denote the attributes of data stored on the optical disc. The meaning of the respective bits are as shown in Table 9.

TABLE 9

| bit [1,0] | 00 | Audio Data Absent |
|---|---|---|
| | 01 | Main Channel Present |
| | 10 | Sub-Channel Present |
| | 11 | Main/Sub-Channel Present |
| bit [3,2] | 00 | Video Data Absent |
| | 01 | Normal Definition |
| | 10 | only High Definition |
| | 11 | Normal Definition/High Definition |
| bit [5,4] | 01 | Moving Picture |
| | 00 | Still Picture |
| bit [6] | 0 | Reserved |
| bit [7] | 1 | CD - DA Sector |
| | 0 | CD - ROM Sector |

The selection list SL is a list for the user to select the menu.

The selection is made by numerical values from the commander or by coordinates on a menu screen. The region designates the coordinates. The region can designate a selected region by permitting selection with a player of the type in which an alternative is selected on a menu by thrusting a number button as in a remote controller of a CD player. Selection is also permitted with a player of the type in which an alternative is selected by clicking a picture area using a mouse. The region is designated with a rectangle and represented by the position information of its diagonal line. The entire picture is divided into 258 by 258 squares to produce a coordinate system in which the upper left corner is (0,0) and the lower right corner is (255,255) so that a given region is expressed by upper left and lower right coordinates (x,y)–(x',y'). Each region is made up of 4 bytes valued in the sequence of x, y, x' and y'. For example, a region (20,10)–(100,40) is represented by 4 bytes of $14, $0A, $64 and $28. The construction of the selection list SL is as shown in Table 10.

TABLE 10

| Selection List Header | 1 byte |
|---|---|
| Number of Regions: NOR | 1 byte |
| List ID Number | 2 bytes |
| Previous List Offset | 2 bytes |
| Next List Offset: NLO | 2 bytes |
| Cancel List Offset | 2 bytes |
| Error List Offset | 2 bytes |
| Time-out List offset | 2 bytes |
| Wait For Time-out | 1 byte |
| Reserved | 1 byte |
| Selection Table Offset | 2 bytes |
| Play Item Offset | 2 bytes |
| Base of Selection Region: BSR | 2 bytes |
| Previous Region | 4 bytes |
| Next Region | 4 bytes |
| From Selection Region #base+0 | 4 bytes each |
| To Selection Region #base+NOR-1 | |

The selection list header denotes the selection list SL. The corresponding information is $18.

The number of regions denotes the number of regions stated in the list.

The list ID number, previous list offset and the cancel list offset are the same as those for the play list PL.

The next list offset NOL denotes an offset in which there is stored a list to which processing is transferred when employing the next function.

The error list offset denotes the offset where there is stored a list to which processing is transferred when the offset corresponding to the selected number has not been registered in the selection table.

The time-out offset denotes an offset where there is stored a list to which processing is transferred when selection has not been made after lapse of time as designated by the wait time.

The wait for timeout denotes the wait time until time-out. The LSB of the wait for time-out corresponds to 0.5 sec. In the wait for timeout, $00, $01 and $FF denote "do-not-wait", wait for 0.5 seconds and wait until user's selection, respectively.

The selection table offset denotes an offset where a selection table (as later explained) is stored.

The play item offset denotes the offset of an item reproduced for displaying a menu screen or the like.

The base of selection region BSR denotes the start number of a selection number of a selection region which will be explained subsequently. For example, if the minimum value of the selection number afforded by the selection list SL is equal to 8, 8 is written in the area.

The previous region denotes an area on the screen for selecting the next function.

13

The selection region #n denotes a region on the screen for selecting a selection number n.

The selection table ST is a table for affording the list offset corresponding to the selected value.

The construction of the selection table is as shown in Table 11.

TABLE 11

| Number of Selections: NOS | 2 bytes |
|---|---|
| Base of Selection Number: BSN | 2 bytes |
| From Selection #BSN Offset | 2 bytes each |
| To Selection #BSN+NOS−1 Offset | |

The number of selection NOS denotes the number of offsets stated in the table and stated by binary (hi-level values).

The base of selection number BSN denotes the start number of the selection number.

The selection #n.offset (selection #n offset) denotes the offset where there is stored a list to which processing is transferred when the selection number BSN+n−1 is selected.

In addition, when the application is carried out over plural optical discs, it is possible for the play sequence descriptor PSD to contain a change volume list or a change volume list type 2 shown below.

The change volume list CL is list for effecting optical disc exchange for application over plural optical discs.

The change volume list is as shown in Table 12.

TABLE 12

| Change Volume Last Header | 1 byte |
|---|---|
| List Mode | 1 byte |
| Disc ID | 8 bytes |
| Cancel List offset | 2 bytes |
| List ID of Next Disc | 2 bytes |
| Error Item Offset | 2 bytes |
| Return List Offset | 2 bytes |

If the return list offset is not zero, there is the following list shown in Table 13.

TABLE 13

| Number of Item: NOI | 1 byte |
|---|---|
| Wait Time | 1 byte |
| Play Item #1 ID | 2 bytes each |
| Play Item #NOI ID | |

The change volume list type 2 is a list for effecting optical disc exchange for an application over plural optical discs. The change volume list has been extended so that control may be effected for a CD title other than the video CD. The list is followed by description of the play item PI for an exchanged optical disc.

The construction of the change volume list type 2 is as shown in Table 14.

TABLE 14

| Change Volume List 2 Header | 1 byte |
|---|---|
| List Mode | 1 byte |
| Disc ID | 8 bytes |
| Cancel List Offset | 2 bytes |
| List ID of Next Disc | 2 bytes |
| Error Item Offset | 2 bytes |
| Return List Offset | 2 bytes |
| Number of Item: NOI | 1 byte |
| Wait Time | 1 byte |

14

TABLE 14-continued

| From Play Item #1 Offset | 2 bytes each |
|---|---|
| To Play Item #NOI Offset | |

The play item is followed by a play item PI of a destination of the exchanged optical disc.

The required key functions include next, previous, skip, cancel, fast feed (FF) and rewind (FR).

Finally, the end list EL is a list to which processing is transferred after end of the sequence.

The construction of the end list is as shown in Table 15.

TABLE 15

| End List Header | 1 byte |
|---|---|
| Reserved | 7 bytes |

The end list header denotes the end list.

Figure 18:
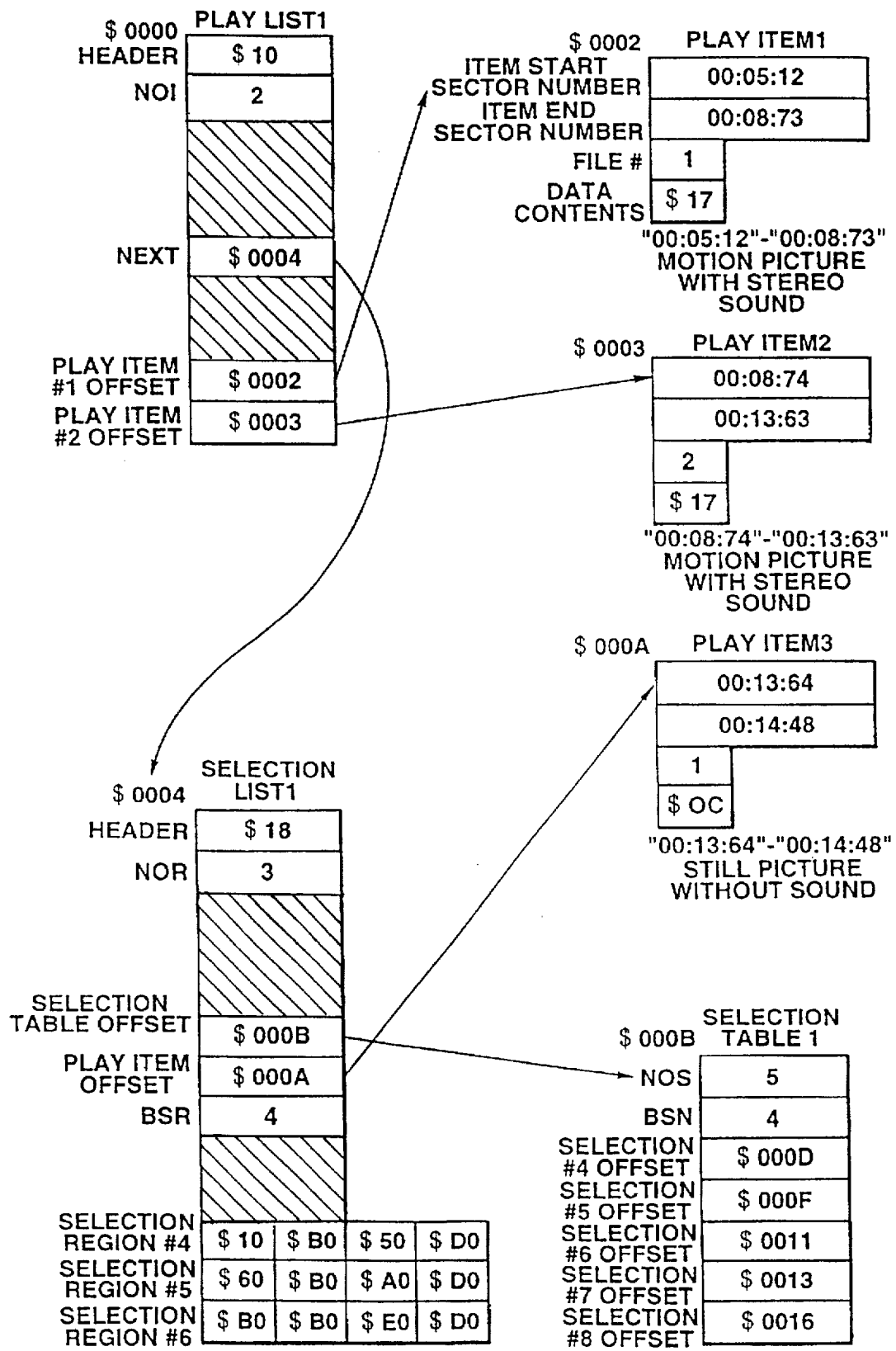
FIG. 18 is a diagram of a play list and a selection list.
Figure 19:
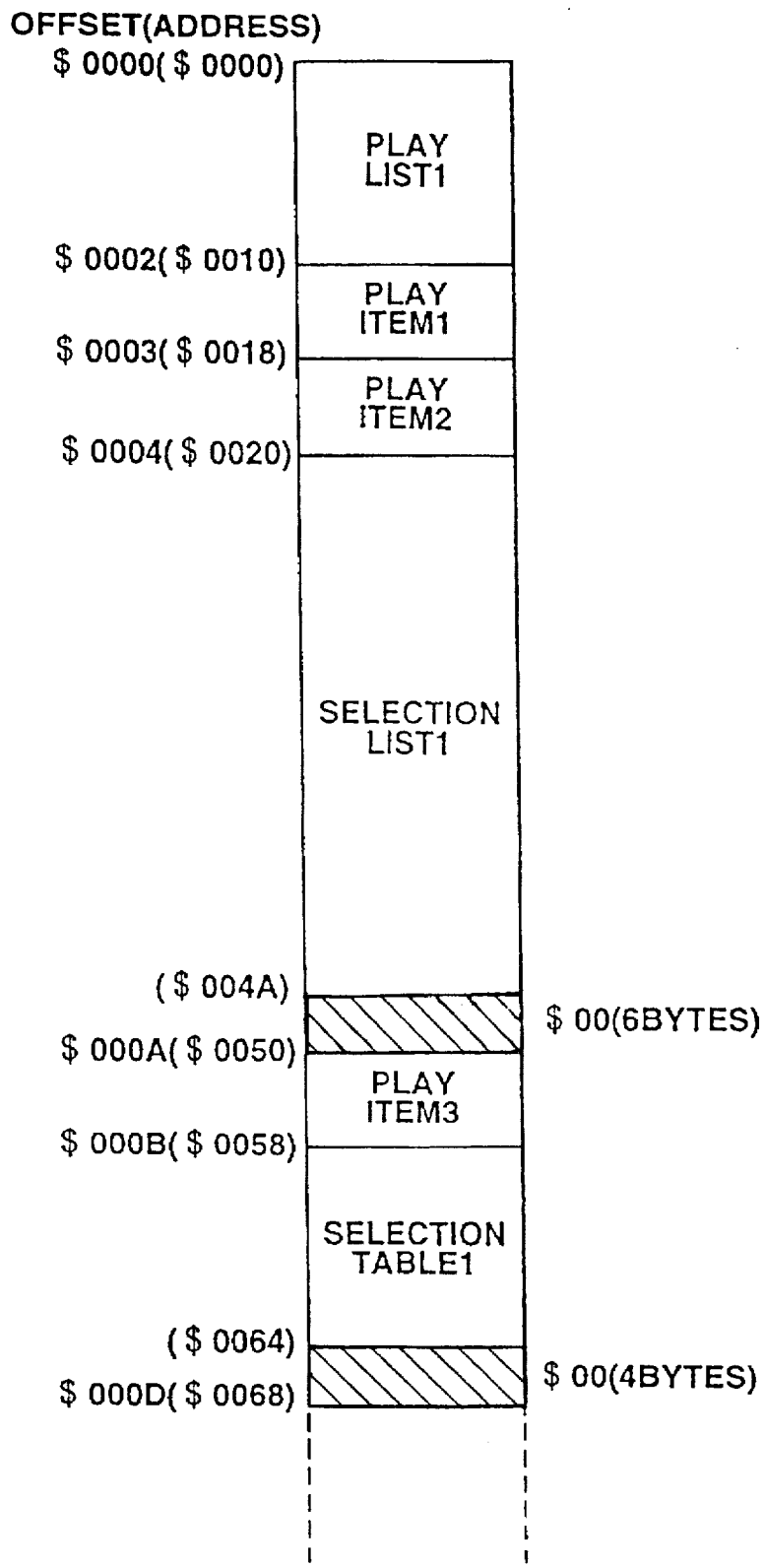
FIG. 19 illustrates the layout of storage of the play sequence descriptor in a memory.

Referring to FIGS. 18 and 19, an example of the construction of the play sequence descriptor PSD is explained. FIGS. 18 and 19 show the relation of interconnection of the play list PL, play item PI, selection list SL and the selection table and the layout when storing the play sequence descriptor PSD in e.g. the RAM 6 of FIG. 2, respectively. Meanwhile, FIG. 18 only shows a portion of data in the play list PL and in the selection list SL for simplicity.

The header of play list PL1 of FIG. 18 states $10 as explained above. The number of play item NOI states 2 thus showing that two play items PI are stated in the play list PL1. The next list offset states $0004 showing that a list (selection list SL1 in FIG. 18) to which processing is transferred when reproduction of the total items in the play list PL1 has come to a close or when the next function has been selected by the user and there is no remaining item to be reproduced is stored in a memory at an offset of $0004 from the leading end of the play sequence descriptor PSD, as shown in FIG. 19. The play item #1 offset states $0002, showing that, when the play item PI1 concerning the item 1 is stored in the memory, it is stored at an offset of $0002 from the leading end of the play sequence descriptor PSD, as shown in FIG. 19. The play item #2 offset states $0003, showing that, when the play item PI2 concerning the item 2 is stored in the memory, it is stored at an offset of $0003 from the leading end of the play sequence descriptor PSD, as shown in FIG. 19.

Also, in the play item PI1 concerning the item 1, "00:05:12", "00:08:73", 1 and $17 are stated as an item start sector number, an item end sector number, file number and as data contents, respectively. Thus it is seen that, for reproducing the item 1, it suffices to read the sectors denoted by "00:05:12" up to "00:08:73" on the optical disc, while it is seen from the data contents that the contents of the item 1 are a moving picture with a stereo sound. Also, in the play item PI2 concerning the item 2, "00:08:74", "00:13:63", 2 and $17 are stated as an item start sector number, an item end sector number, file number and as data contents, respectively. Thus it is seen that, for reproducing the item 2, it suffices to read the sectors denoted by "00:08:74" up to "00:13:63" on the optical disc, while it is seen from the data contents that the contents of the item 2 are a moving picture with a stereo sound.

Meanwhile, since the play items PI1 and PI2 are substantially data belonging to the play list PL1, the play list PL1 and the play items PI1 and PI2 together may be regarded as being a sole play list PL.

In the selection list SL1 of FIG. 18, there is stored $18 as the selection list header, as stated above. The number of regions list SL NOR stores 3, meaning that three regions are stated by the selection list SL, that is that, if a pointing device such as a mouse is employed, three numerical values may be entered by indicating three different regions. The selection table offset states $000B, showing that, when the selection table 1 concerning the selection list SL1 is stored in the memory, it is stored at an offset of $000B from the leading end of the play sequence descriptor PSD, as shown in FIG. 19. The play item offset states $000A, showing that when the play item PI3 concerning the item 3 is stored in the memory, it is stored at an offset of $000A from the leading end of the play sequence descriptor PSD, as shown in FIG. 19. The base of selection region BSR states 4, meaning that the start number of the selection region is 4. The selection regions #4, #5 and #8 state $10, $B0, $50 and $80, $B0, $A0 and $D0 and $B0, $B0, $E0 and $D0, respectively, showing the coordinates associated with the three regions.

Also, in the play item PI3 concerning the item 3, "00:13:84", "00:14:48", 1 and $0C are stated as an item start sector number, an item end sector number, file number and as data contents, respectively. Thus it is seen that, for reproducing the item 3, it suffices to read the sectors denoted by "00:13:84" up to "00:14:48" on the optical disc, while it is seen from the data contents that the contents of the item 3 are a moving picture without a sound.

The selection table 1 concerning the selection list SL1 states 5 as a number of selection NOS, showing that five selection #n offsets corresponding to five lists are stored in the selection table. The selection table 1 states 4 as the base of selection number BSN, showing that the start number of the selection number is 4. The selection table 1 states the five #n offsets, as explained above, showing that the lists of the corresponding numbers are stored at the offsets of $000D, $000F, S0011, $0013 and $0018 from the leading end of the play sequence descriptor PSD when the lists are stored in the memory.

Meanwhile, since the play item PI3 and the selection table 1 are substantially data belonging to the selection list SL1, the selection list SL1, the play items PI3 and the selection table 1 collectively may be regarded as being one selection list SL.

Meanwhile, since the offset is represented by 8 bytes as one unit, the portions corresponding to addresses from $004A to $0050 and from $0084 to $0068 in FIG. 19 are stuffed with zeros on the memory as being vacant space.

Figure 20:
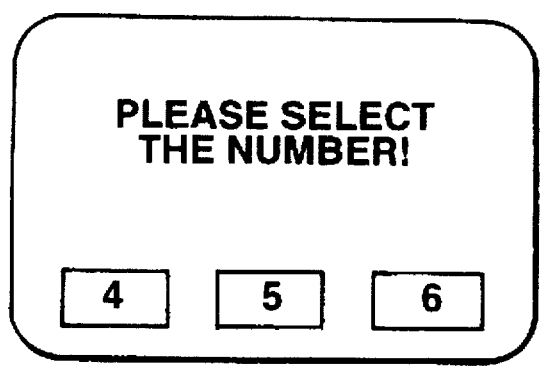
FIG. 20 illustrates an example of a menu picture.

FIG. 20 shows a display screen when the item 3 is reproduced. The item 3 is a menu picture for selection by the user using the menu. If the user moves a cursor, not shown, to a position 4 on the display screen using a mouse, and clicks at the position, this is tantamount to indicating an area defined by the selection region #4, thus indicating the selection #4 offset of the selection table 1 corresponding to the region. The offset $000D of the list of the corresponding number can be known from the contents of the selection #4 offset, so that selection may be made of the list corresponding to 4 on the display screen.

Figure 8:
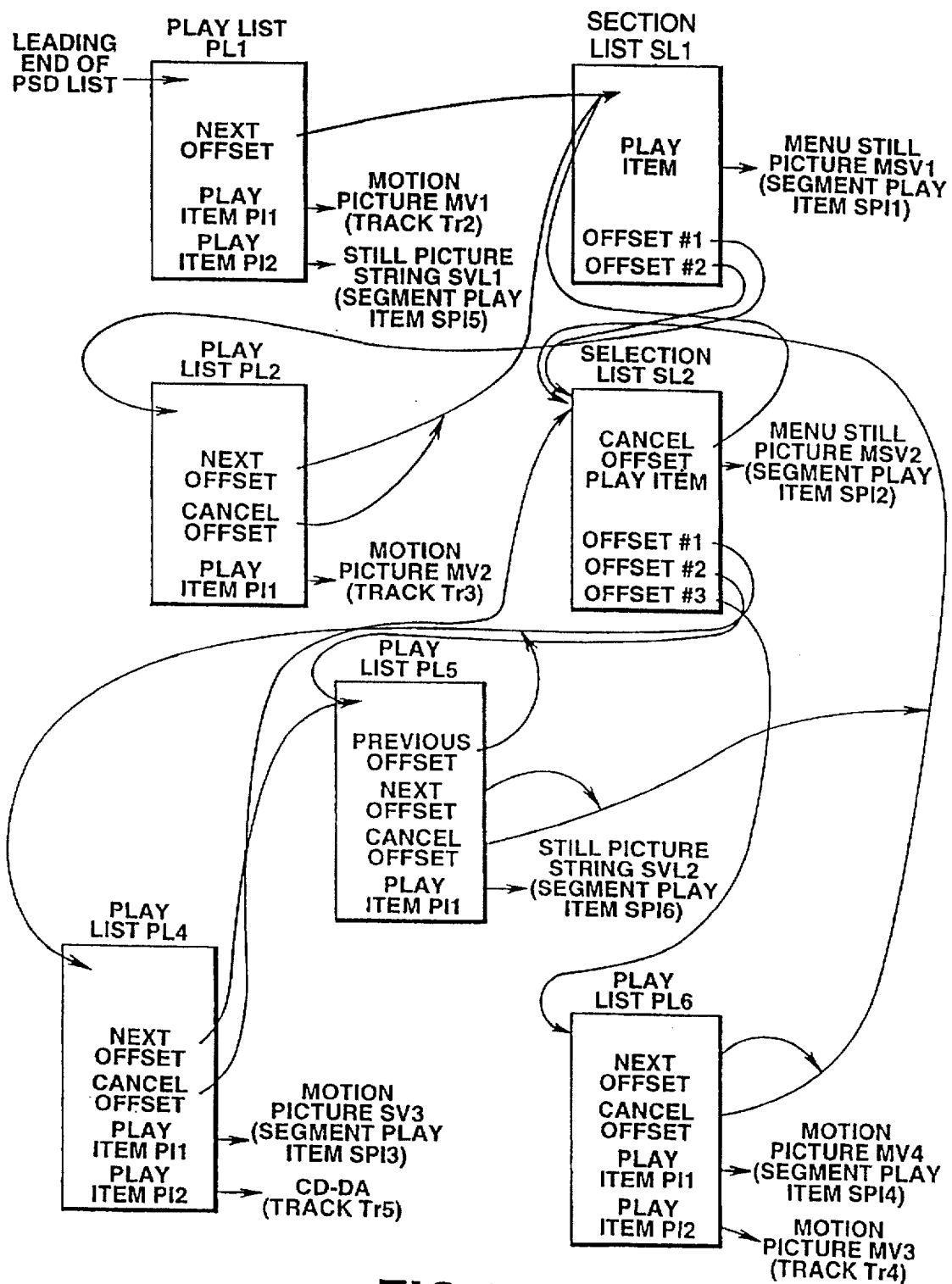
FIG. 8 illustrates an exemplary operation of a playback control (play sequence descriptor) of the present embodiment.

The above-described playback control is explained by referring to FIGS. 8 and 1. FIG. 8 shows an embodiment different from FIGS. 18 and 19 and thus shows an example in which five play lists PL and two selection lists SL have been stored in the playback sequence descriptor PSD. In the present embodiment, the play item PI is stated as being a part of the associated play list PL or the selection list SL, while the selection table is stated as being a part of the associated selection list SL.

When the optical disc of the present embodiment (video CD) is loaded on a CD deck 1 shown in FIG. 2, the playback mode employing playback control is automatically entered (automatic playback mode) so that the list starts to be interpreted from an item corresponding to the initial play item PL1 disposed at the leading end of the play sequence descriptor PSD shown in FIG. 8. In the play list PL, playback is started sequentially from an item corresponding to the first play item PI. Thus, in the play list PL1, the play item PI1 is first designated so that, for example, the moving picture MV1 of track Tr2 of FIG. 1 starts to be reproduced. The play item PI2 is then designated and the still picture train SVL1 of the segment play item SP15 of FIG. 1 starts to be reproduced. If there is no request by the user, the moving picture MV1 and the still picture train SVL1 are sequentially designated in the play list PL1. However, the play items PI1 and PI2 may be selected depending on the user's request so that the reproduced item will be switched responsive to such request. For example, if the user selects the next key provided on the switch 11 or the remote controller 9 in FIG. 2 during reproduction of the moving picture MV1, the reproduced item is switched to the still picture train SVL1. If the user selects the previous key provided on the switch 11 or the remote controller 9 in FIG. 2 during reproduction of the still picture train SVL1, the reproduced item is switched to the moving picture MV1. If, with the play list PL1, the user selects the next key during reproduction of the still picture train SVL1, or the reproduction of the moving picture MV1 and the still picture train SVL1 comes to a close, transfer occurs to interpretation of the selection list SL1 of FIG. 8 based on the next list offset.

On transferring to the selection list SL1, the item designated on the play item offset is designated and the menu still picture MSV1 of the segment play item SPI1 of FIG. 1 is automatically reproduced. It is now possible for the user to select the list desired to be transferred to next using the number displayed on the menu still picture MSV1. If, in the menu still picture MSV1 of the selection list SL1, the user enters the number 1, using the number input key provided on the switch 11 or the remote controller 9 of FIG. 2, the selection #1 offset is designated to proceed to interpretation of the play list PL2. If the user enters the number 2, the selection #2 offset is designated to transfer to interpretation of the selection list SL2.

In the play list PL2, the play item PI1 is designated and the moving picture MV2 of track Tr3 of FIG. 1 is automatically reproduced. If, in the play list PL2, the user selects the switch 11 of FIG. 2 or the next key provided on the remote controller 9, interpretation of the list corresponding to the next list offset is entered. If the user selects the cancel key provided on the remote controller 9 or switch 11 provided on the remote controller 9, interpretation of the list corresponding to cancel list offset is entered. However, the same offset value is described in the next list offset and the cancel list offset of the play list PL2 of the present embodiment. Whichever of these is selected, the selection list SL1 is re-entered. When the reproduction of the moving picture MV2 comes to a close, reversion is made to the selection list SL1 based upon the next list offset.

In the selection list SL2, the item stated on the play item offset is designated and the menu still picture MSV2 of the segment play item SPI2 of FIG. 1 is produced. If the user selects the cancel key, reversion is made to the selection list SL1 based upon the cancel list offset. Conversely, if the number 1 displayed on the menu still picture MSV2, the selection #1 offset is selected and the play list PL4 is entered. If the number 2 is entered, the selection #2 offset is selected and the play list PL5 is entered. If the number 3 is entered, the selection #3 offset is selected and the play list PL6 is entered.

In the play list PL4, the play item PT1 is first designated and the still picture SV3 of the segment play item SP13 of FIG. 1 is reproduced. The play item PI2 is then designated to reproduce the CD-DA of the track Tr5 of FIG. 1. If, in the play list PL4, the user selects the next key during reproduction of CD-DA or the reproduction of the still picture SV3 or the CD-DA comes to a close, the play list PL5 is entered based upon the next list offset. If the user selects the cancel key, reversion is made to the selection list SL2 based upon the cancel list offset.

In the play list PL5, the play item PI1 is designated and the still picture train SVL2 of the segment play item SP16 of FIG. 1 is reproduced. If the user selects the previous key, reversion is made to the play list P4 based upon the previous list offset. If, in the play list PL5, the user selects the next key, reversion is made to the selection list SL2 based upon the next list offset. If the user selects the cancel key, reversion is made to the selection list SL2 based upon the cancel list offset. That is, the next list offset and the cancel list offset of the play list PL5 are of an equal offset value. Also, when the reproduction of the still picture train SLV2 comes to a close, the next list offset is designated, and reversion is made to the selection list SL2.

In the play item PI1, the play list PI1 is selected and the moving picture MV4 of the segment play item SPI4 of FIG. 1 is reproduced. The play item PI2 is then designated and the moving picture MV3 of the track Tr4 of FIG. 1 is reproduced. If, in the play list PL6, the user selects the next key, reversion is made to the selection list SL2 based upon the next list offset. Also, when the reproduction of the moving pictures MV4 and MV3 comes to a close, the next list offset is designated, and reversion is made to the selection list SL2. If the user selects the cancel key, reversion is made to the selection list SL2 based upon the cancel list offset. The next list offset and the cancel list offset of the play list PL6 are of an equal offset value.

Figure 9:
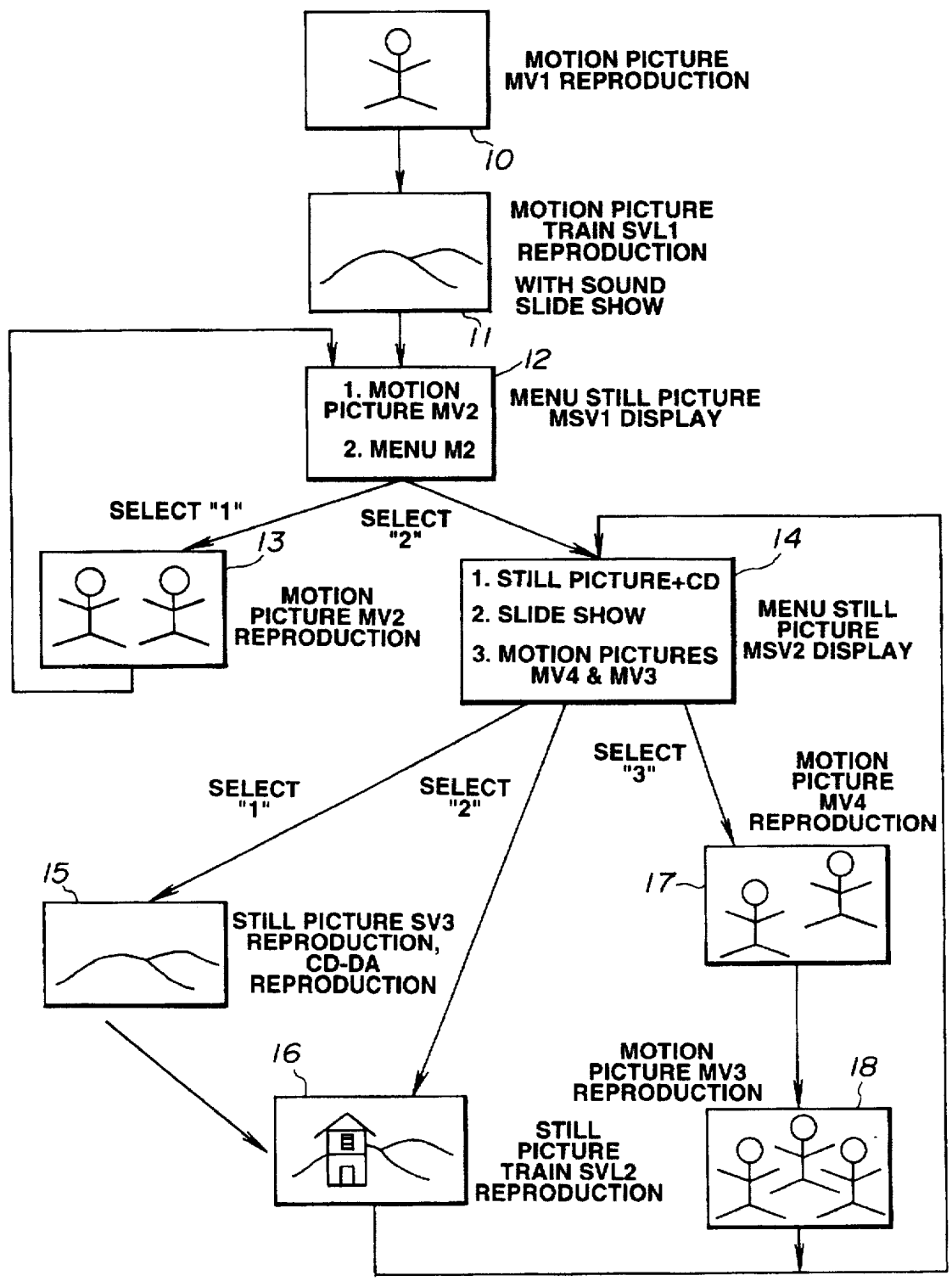
FIG. 9 illustrates an exemplary operation of a playback control (play sequence descriptor) of the present embodiment taking an example of an actual screen.

A more specific example of the playback control function in FIGS. 8 and 1 is explained by referring to FIG. 9. FIG. 9 shows a display screen of a display device, not shown, connected via a terminal 26 of FIG. 2. The display device may be a monitor display employing a liquid crystal display or a CRT. FIG. 9 shows an example in which several menu still pictures are provided in the segment play item SPI of the track Tr1 of FIG. 1 and simple branch reproduction is enabled in combination with the moving pictures pursuant to MPEG downstream of the track Tr2.

It is assumed that, as shown in FIG. 9, a playback picture 10 of the moving picture MV1 when the play item PI1 is designated in the play list PL1 of FIG. 8. By the play item PI2, thus designated, the playback picture 11 of a slide show with the sound is displayed on the monitor display as the still picture train SVL1.

When the user selects the next list offset, or the slide show comes to a close and the next list offset is designated, the selection list SL1 of FIG. 1 is entered and the playback picture 12, of the menu still picture MSV1 is displayed on the monitor display.

If "1" corresponding to the offset #1 in the selection list SL1 of FIG. 8 is selected, the play list PL2, of FIG. 8 is entered, and the play item PI1 in the play list PL2, is entered so that the playback picture 13 of the moving picture MV2 is displayed on the monitor display. If the next list offset or the cancel list offset is selected, the display picture on the monitor display to reverts to the playback picture 12. If the reproduction of the moving picture MV4 comes to a close, the next list offset is designated to revert to the playback picture 12.

If "2" corresponding to the offset #2 in the selection list SL1 is selected, the selection list SL2 of FIG. 8 is entered, so that the playback picture 14 of the menu still picture MSV2 is displayed on the monitor display.

If "1" corresponding to the offset #1 in the selection list SL2 of FIG. 8 is selected, the play list PL of FIG. 8 is entered, and the play item PI1 in the play list PL4 is entered so that the playback picture 15 of the still picture SV3 is displayed on the monitor display as a sole still picture. Alternatively, the play item PI2 is designated and the CD-DA is reproduced (CD sound is reproduced).

If, in the play list PL4, the next list offset is selected, or the reproduction of the still picture SV3 and reproduction of the CD-DA comes to a close, the play list PL5 of FIG. 8 is entered by the next list offset. The play item PI1 is designated in the play list PL5 so that a slide show, for example, of the still picture train SVL2 is displayed on the monitor display as the playback picture of the still picture train SVL2.

The play list PL5 may also be entered by selecting "2" corresponding to the offset #2 in the selection list SL2 of FIG. 8 in the state of the playback picture 14 of the menu still picture MSV2. At this time, the play item PI1 is designated in the play list PL5, so that similarly the slide show is displayed on the monitor display as a playback picture 16 of the still picture train SVL2.

If, in the play list PL5, the next list offset or the cancel list offset is selected, the display picture on the monitor display reverts to the playback picture 14 of the menu still picture MSV2. The next list offset is also designated when the reproduction of the still picture train SVL2 is designated to revert to the playback picture 14.

If, in the state of the playback picture 14 of the menu still picture MSV2, "3" corresponding to the offset #3 in the selection list SL2 of FIG. 8 is selected, the play list PL6 of FIG. 8 is entered. In the play list PL5, the play item PI1 is designated for displaying the display picture 17 of the moving picture MV4, or the play item PI2 is designated for displaying the playback picture 18 of the moving picture MV3 is displayed on the monitor display.

In the play list PL5, the display picture on the monitor display reverts to the playback picture 14 of the menu still picture MSV2 if the next list offset or the cancel list offset is selected. If the playback of the moving pictures MV3 and MV4 comes to a close, the next list offset is designated to revert to the playback picture 14.

Figure 10:
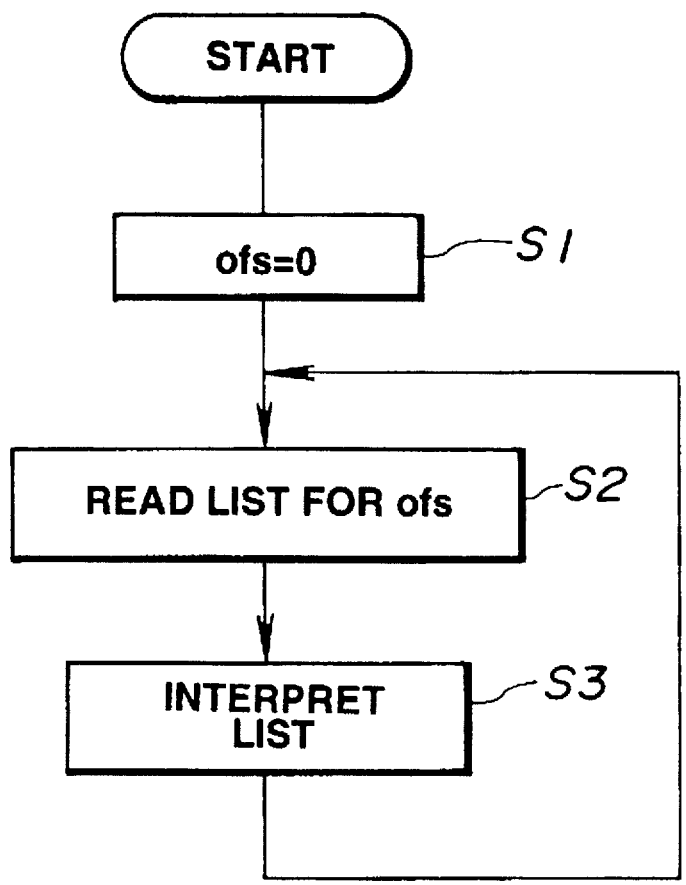
FIG. 10 is a flow chart showing the processing flow for offset initialization and reading of an offset list.

The process flow of the CPU 4 in the playback control function is explained by referring to each flow chart of FIGS. 10 ff.

FIG. 10 is a flow chart on the offset (ofs). In this figure, the offset is initialized at step S1 to offset (ofs)=0. At step S2, the list associated with the initialized offset, the offset as set with execution of the lists as later explained, and the offset corresponding to the offsets designated via the list ID offset table LOT, are read. At step S3, the list is interpreted and executed.

Figure 11:
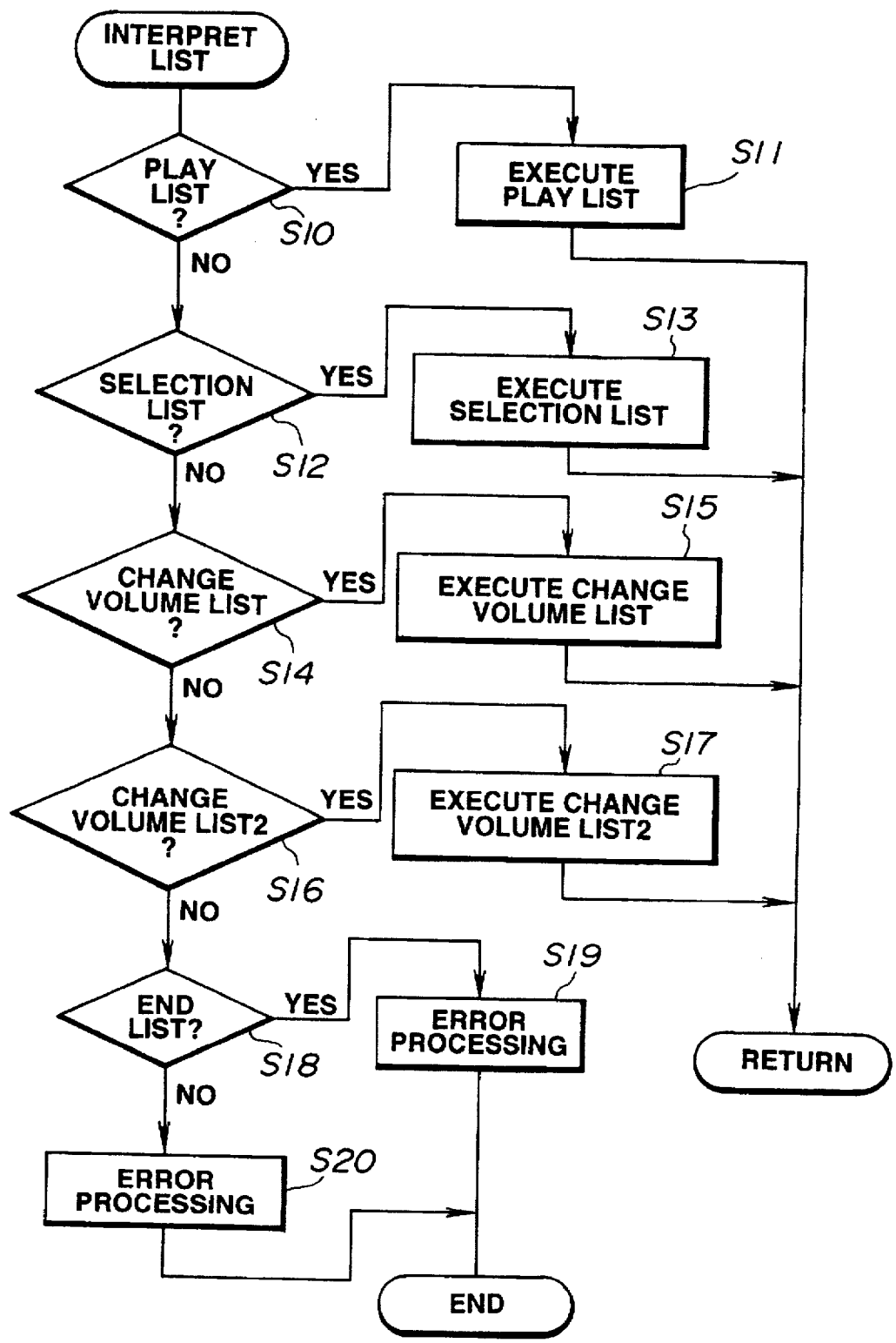
FIG. 11 is a flow chart showing the processing flow of list interpretation and execution.

FIG. 11 is a flow chart on interpretation and execution of the list.

At step S10 of FIG. 11, it is judged whether or not the play list PL has been selected or executed. If the result of decision at step S10 is YES, the program transfers to execution of the play list PL of step S11 after which program return is made. If the result of decision at step S10 is NO, the program transfers to step S12.

At step S12, it is judged whether or not the selection list SL has been selected or designated. If the result of decision at step S12 is YES, the program transfers to execution of the selection list SL at step S13 before program return. If the result of decision at step S12 is NO, the processing transfers to step S14.

At step S14, it is determined whether or not the change volume list has been selected or designated. If the result of decision at step S14 is YES, the processing transfer to execution of the change volume list before program return. If the result of decision at step S14 is NO, the processing transfers to step S16.

At step S16, it is determined whether or not the change volume list 2 has been selected or designated. If the result of decision at step S16 is YES, the processing transfers to execution of the change volume list 2 before program return. If the result of decision at step S16 is NO, the processing transfers to step S18.

At step S18, it is determined whether or not the end list has been selected or designated. If the result of decision at step S18 is YES, the processing transfer to execution of the end list before program return. If the result of decision at step S18 is NO, the processing transfers to step S20.

At step S20, error execution processing is carried out before processing comes to a close.

Figure 12:
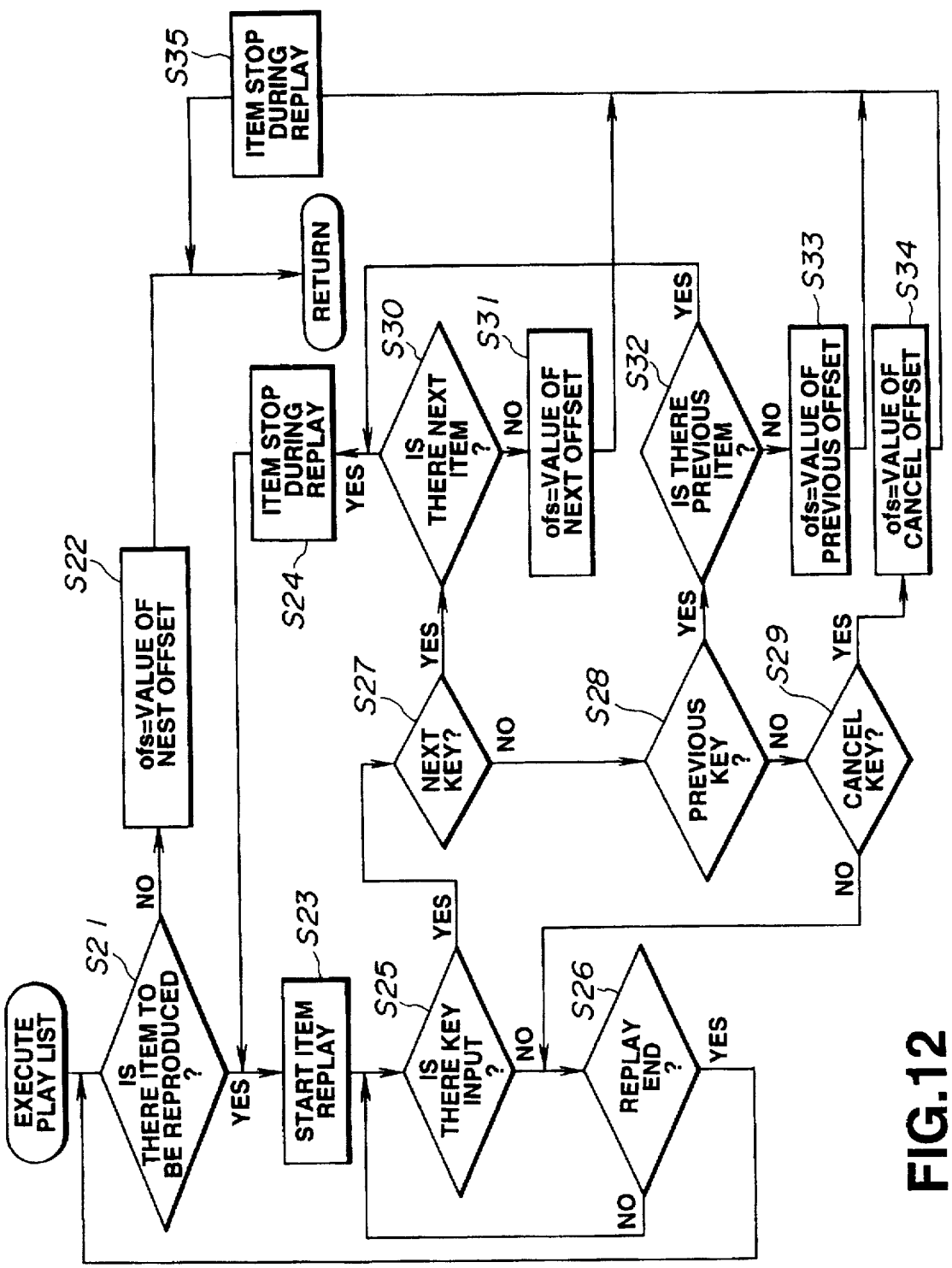
FIG. 12 is a flow chart showing the processing flow of play list execution.

FIG. 12 is a flow chart for execution of the play list PL.

In FIG. 12, it is determined whether or not there is any item to be reproduced, that is if there is any item yet to be reproduced. If the result of judgment at step S21 is NO, offset is set to next list offset (offset=next list offset). If the result of decision at step S21 is YES, the processing transfers to step S23.

At step S23, the item starts to be reproduced before proceeding to step S25.

At step S25, it is determined whether or not the key input by the user has been made. If the result of decision at step S25 is NO, the processing transfers to step S28 where it is determined whether or not the reproduction has come to an end. If the result of decision at step S26 is YES, the processing reverts to step S21. If the result of decision is NO, the processing reverts to step S25. If the result of decision at step S25 is YES, the processing transfers to step S27.

At step S27, it is judged whether or not the next key has been entered. If the result of decision at step S2 is NO, the processing transfers to step S28 and, if otherwise, the processing transfers to step S30.

At step S28, it is judged whether or not the previous key has ben entered. If the result of decision at step S28 is YES, the processing transfers to step S32 and, if otherwise, the processing transfers to step S29.

At step S29, it is judged whether or not the cancel key has been entered. If the result of decision at step S29 is NO, the processing transfers to step S26. If the result of decision at step S29 is YES, offset is set at step S34 to cancel list offset (offset=cancel list offset) before processing transfers to step S35 where the item being reproduced is halted. After step S35, program return is made. The function similar to that of the cancel key may be afforded to a return key.

After the decision of YES at step S27, it is judged at step S30 whether or not there is any next item. If the result of decision at step S30 is YES, processing transfers to step S24 where the item being reproduced is halted before the processing reverts to step S23. If the result of decision at step S30 is NO, the processing transfers to step S31 where the offset is set to next list offset (offset=next list offset) before processing transfers to step S35.

After the decision of YES at step S28, it is judged at step S32 whether or not there is any next item. If the result of decision at step S32 is YES, processing transfers to step S24.

If the result of decision at step S30 is NO, the processing transfers to step S23 where the offset is set to previous list offset (offset=previous list offset) before processing transfers to step S35.

Figure 13:
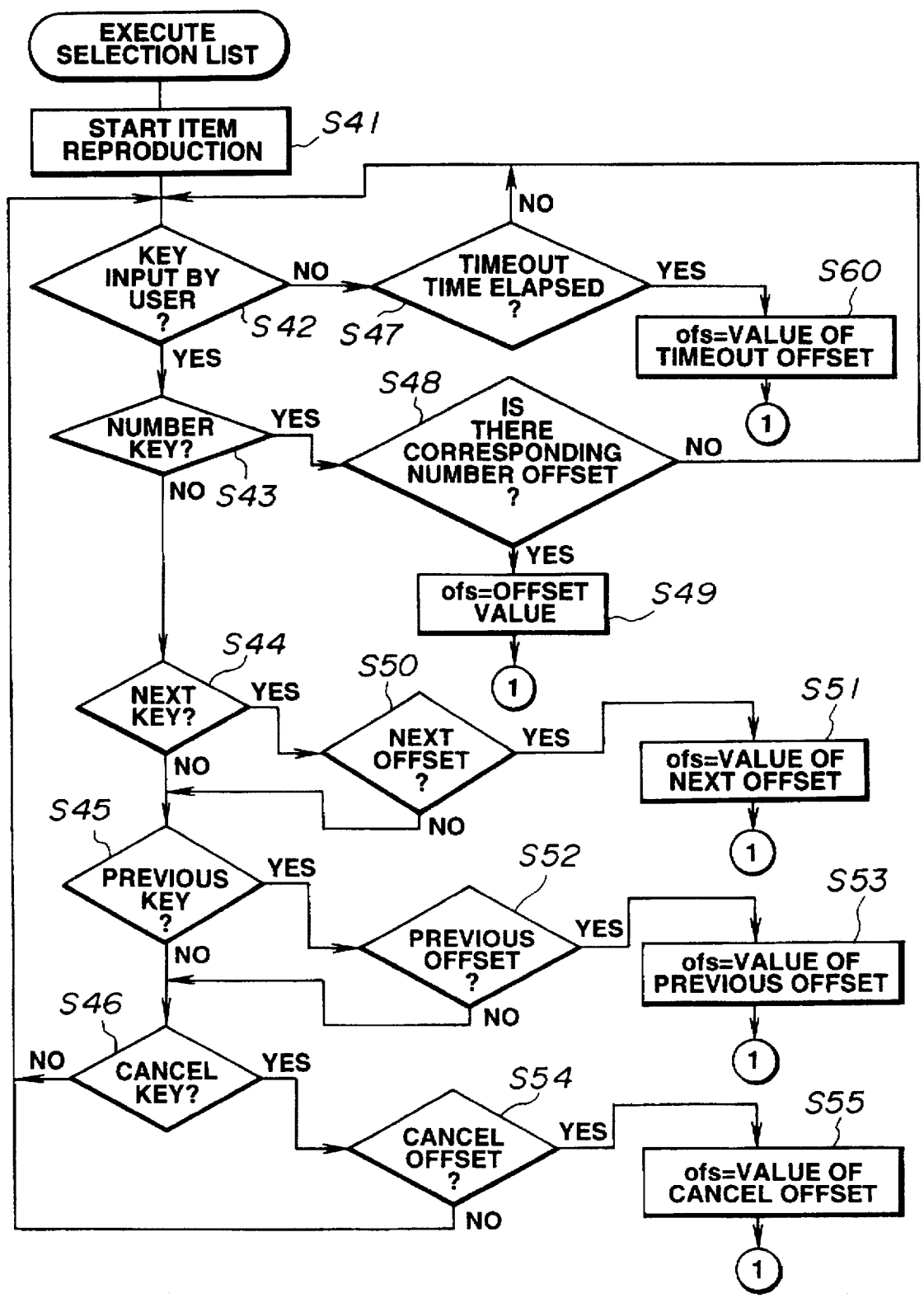
FIG. 13 is a flow chart showing the processing flow of selection list execution.

FIG. 13 is a flow chart for executing the selection list SL.

In FIG. 13, the item starts to be reproduced. At step S42, it is judged whether or not the key input by the user has been made. If the result of decision at step S42 is NO, processing transfers to step S47 and, if otherwise, to step S43.

At step S43, it is judged whether or not the key input is derived from the number key. If the result of the decision at step S43 is YES, processing transfers to step S48 and, if otherwise, processing transfers to step S44.

At step S44, it is judged whether or not the key input is the next key. If the result of decision at step S44 is YES, processing transfers to step S50 and, if otherwise, processing transfers to step S45.

At step S45, it is judged whether or not the key input is the previous key. If the result of decision at step S45 is YES, processing transfers to step S52 and, if otherwise, processing transfers to step S48.

At step S48, it is judged whether or not the key input is the cancel key. If the result of decision at step S45 is YES, processing transfers to step S54 and, if otherwise, processing transfers to step S42.

If the result of decision at step S46 is YES, it is judged at step S54 whether or not there is any cancel list offset. If the result of decision at step S48 is YES, processing transfers to step S54. If the result of decision at step S46 is processing reverts to step S42.

If the decision at step S46 is YES, it is judged at step S54 whether or not there is any cancel list offset. If the result of decision at step 54 is NO, processing reverts to step S42. If the result at step S54 is YES, processing transfers to step S55. At step S55, the offset is set to cancel list offset (offset=cancel list offset), before transferring to the processing of FIG. 14.

If the result of decision at step S42 is NO, it is judged at step S47 whether or not a pre-set time by the timing means, that is the time-out time, has elapsed. If the result of step S47 is NO, transfer reverts to step S42 and, if otherwise, processing transfers to step S60. At step S60, offset is set to timeout list offset before transferring to the processing of FIG. 14.

If the result of decision at step S43 is YES, it is judged at step S48 whether or not there is any offset of the corresponding number. If the result of decision at step S48 is NO, processing reverts to step S42. If the result of decision at step S48 is YES, processing transfers to step S49. At step S49, the offset is set to the offset value, before transferring to the processing of FIG. 14.

If the result of decision at step S44 is YES, it is judged at step S50 whether or not there is any next list offset. If the result of decision at step S50 is NO, processing transfers to step S45 and, if the result is YES, transfers to step S51. At step S51, offset is set to next list offset, before transferring to the processing of FIG. 14.

If the result of decision at step S45 is YES, it is judged at step S52 whether or not there is any previous list offset. If the result of decision at step S52 is NO, processing transfers to step S46 and, if the result is YES, transfers to step S53. At step S53, offset is set to previous list offset, before transferring to the processing of FIG. 14.

Figure 14:
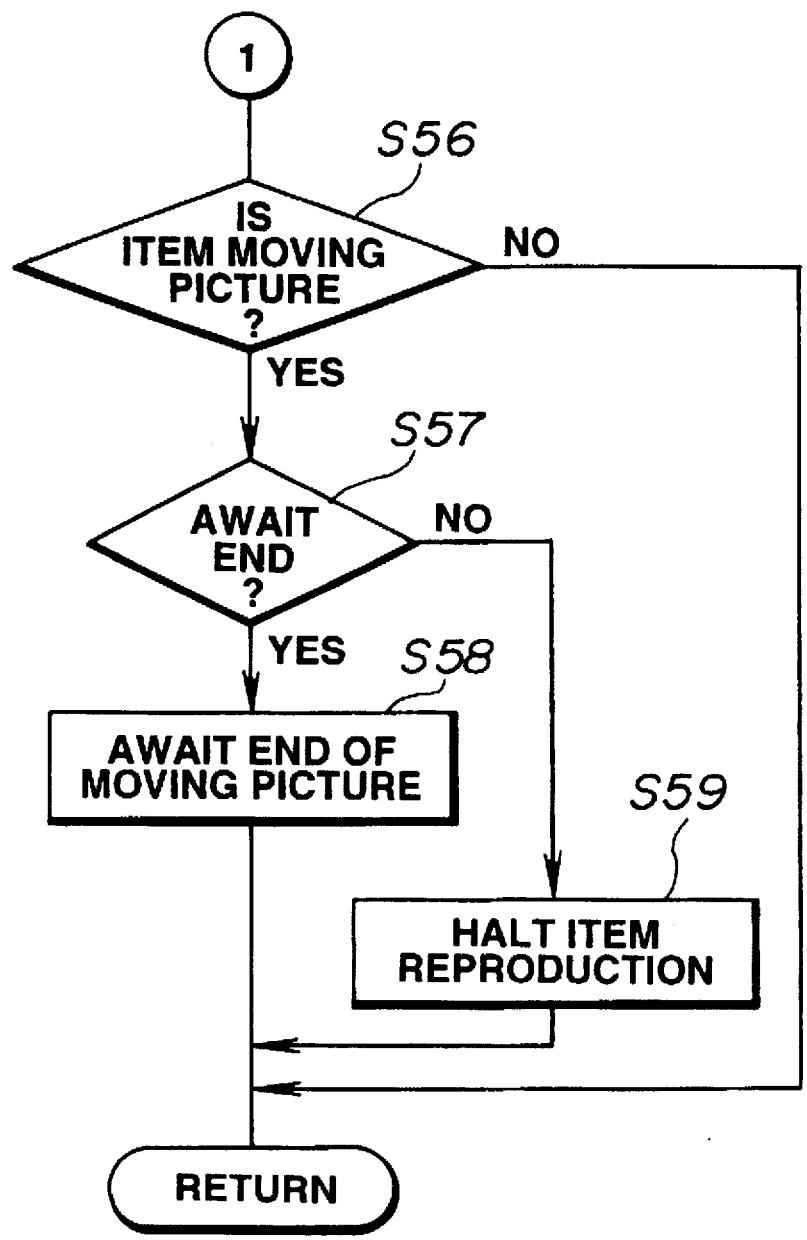
FIG. 14 is showing a portion of a flow chart the processing flow of selection list execution.

In the flow chart of FIG. 14, it is judged at step S56 whether or not an item is a moving picture. If the result of decision at step S56 is NO, program return is made. If the result of decision at step S56 is YES, processing transfers to step S57.

At step S57, it is judged whether or not the end is to be awaited. If the result of decision at step S57 is YES, the end of the moving picture is awaited at step S58, before program return is made. If the result of decision at step S57 is NO, processing transfers to step S59 where the item reproduction is halted before program return.

Figure 15:
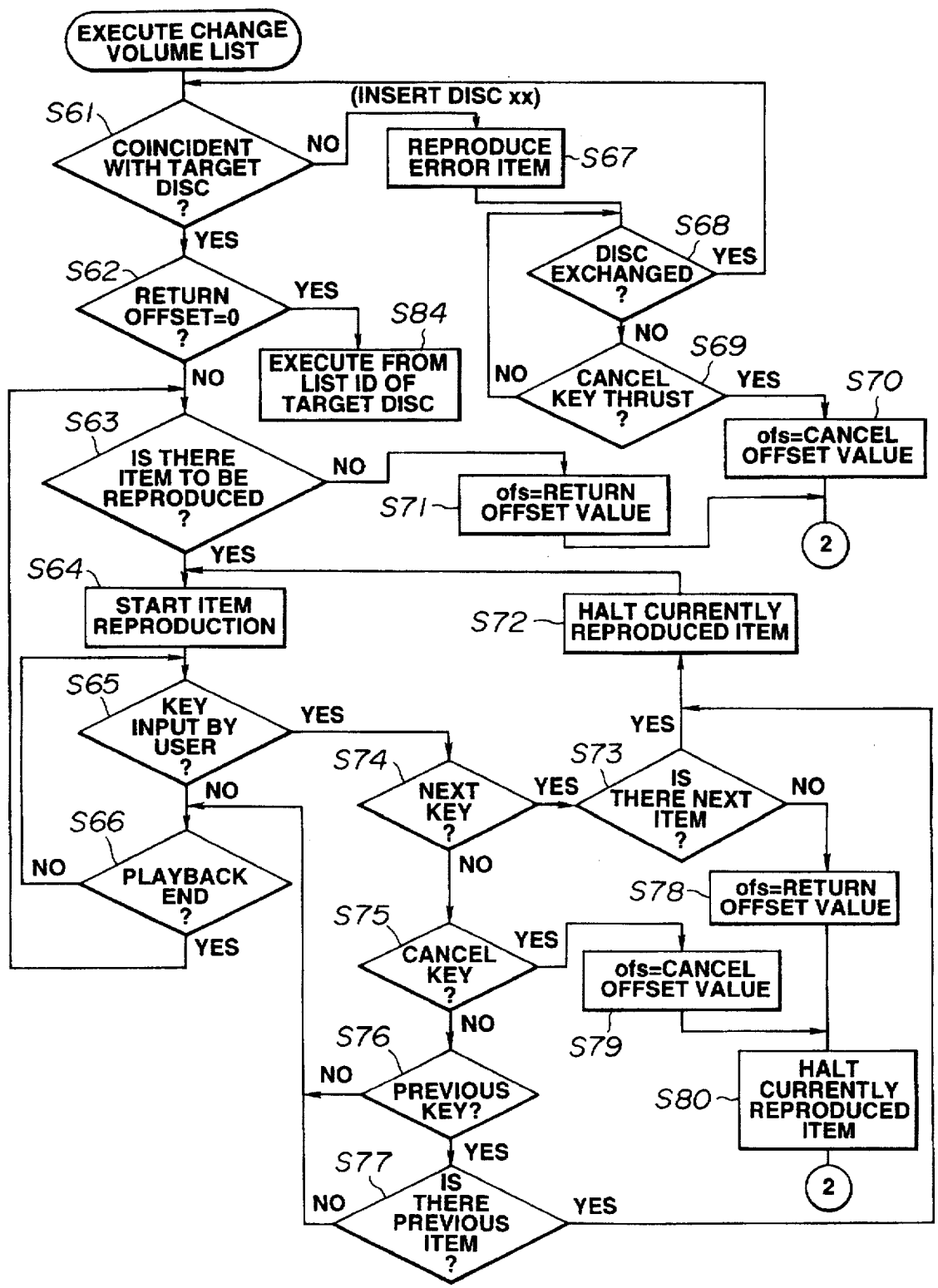
FIG. 15 is a flow chart showing the processing flow of change volume execution.

FIG. 15 shows a flow chart for execution of a change volume list.

In FIG. 15, it is judged at step S61 whether or not there is coincidence with the target disc ID. If the result of decision at step S61 is NO, processing transfers to step S67 and, if otherwise, transfers to step S62.

At step S62, it is judged whether or not the return list offset is equal to zero. If the result of decision at step S62 is YES, the execution processing is made at step S62 from the list ID of the target optical disc. If the result of decision at step S62 is NO, processing transfers to step S63.

At step S63, it is judged whether or not there is any item to be reproduced. If the result of decision at step S63 is NO, offset is set to return list offset (offset=return list offset) before transferring to the processing of FIG. 16. if the result of decision at step S63 is YES, processing transfers to step S64 where the item starts to be reproduced. The processing then transfers to step S65.

At step S65, it is judged whether or not there is any key input made by the user. If the result of decision at step S65 is YES, processing transfers to step S74 and, if otherwise to step S66 where it is judged whether or not playback is to come to an end. If the result of decision at step S66 is NO, processing reverts to step S65 and, if otherwise, processing reverts to step S63.

If the result of decision at step S61 is NO, an error item is reproduced and a display "insert next disc" is made. After step S67, processing transfers to step S68.

At step S68, it is judged whether or not an optical disc has been changed. If the result of decision is YES, processing reverts to step S61. If the result is NO, processing transfers to step S69.

At step S69, it is judged whether or not the cancel key has been thrust. If the result of decision at step S69 is NO, processing transfers to step S70 where the offset is set to cancel list offset (offset=cancel list offset) before transferring to the processing of FIG. 16.

If the result of decision at step S65 is YES, it is judged at step S74 whether or not the key input is that for the next key. If the result of decision at step S74 is YES, processing transfers to step S73 and, if the result is NO, transfers to step S75.

At step S75, it is judged whether or not the key input is that for the cancel key. If the result of decision at step S75 is YES, processing transfers to step S79 and, if otherwise, to step S76.

At step S76, it is judged whether or not the key input is that for the previous key. If the result of decision at step S76 is NO, processing transfers to step S66 and, if otherwise, to step S77.

At step S77, it is judged whether or not there is any previous item. If the result of decision is NO, processing transfers to step S66 and, if otherwise, to step S72.

At step S72, the item being reproduced is halted before reverting to step S64.

If the result of decision at step S74 is YES, it is judged at step S73 whether or not there is any next item. If the result of decision at step S73 is YES, processing transfers to step S72 and, if otherwise, to step S78.

At step S78, the offset is set to return list offset (offset= return list offset) before processing transfers to step S80.

If the result of decision at step S75 is YES, the offset is set to cancel list offset (offset=cancel list offset) before processing transfers to step S80.

Figure 16:
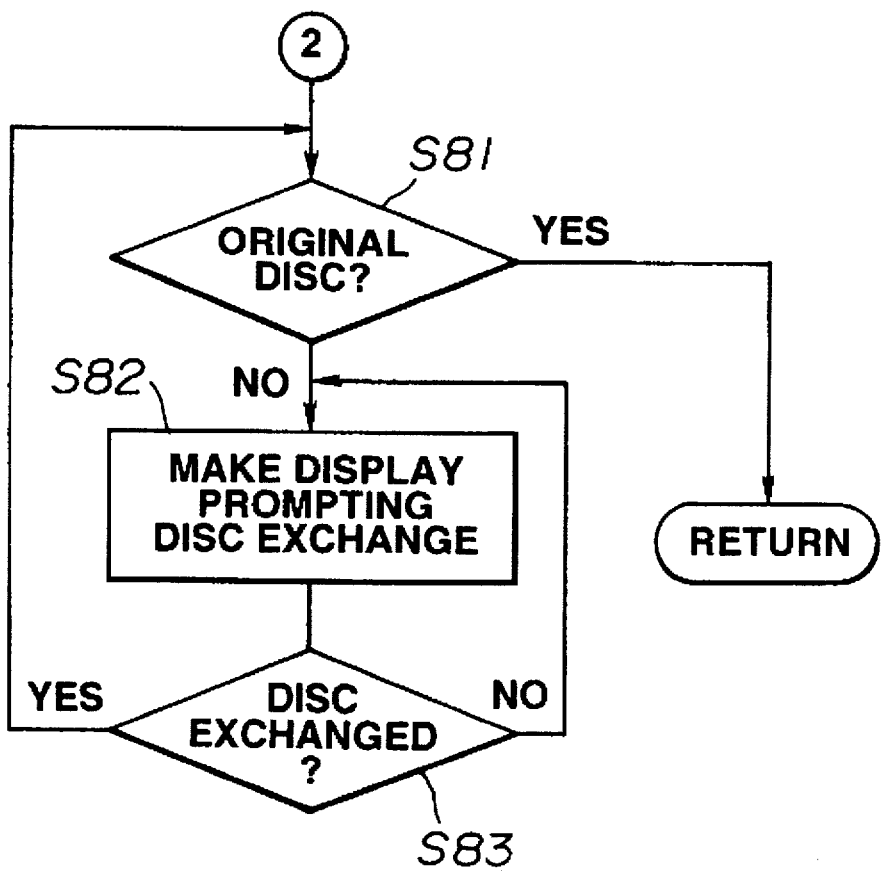
FIG. 16 is the showing a portion of a flow chart of processing for execution of the change volume list and the change volume list type 2.

At step S80, the item being reproduced is halted, before transferring to the processing of FIG. 16.

In the flow chart of FIG. 16, it is judged at step S81 whether or not the optical disc is the original optical disc. If the result of decision at step S81 is YES, program return is made. If otherwise, processing transfers to step S82.

At step S82, display is made for prompting optical disc exchange, after which processing transfers to step S83. At step S83, it is judged whether or not the optical disc has been exchanged. If the result of decision is YES, processing reverts to step S81 and, if the result is NO, processing reverts to step S82.

Figure 17:
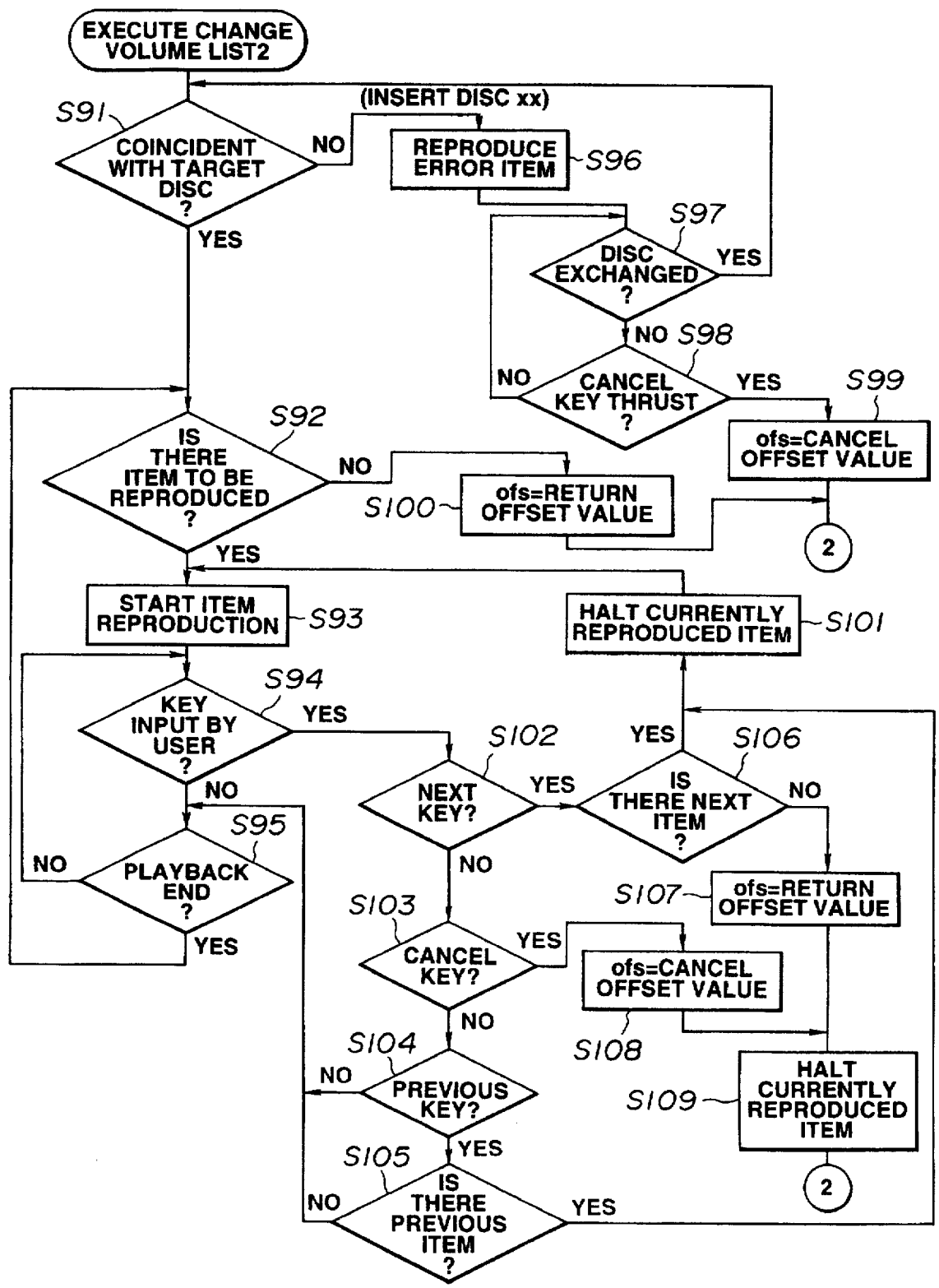
FIG. 17 is a flow chart showing the flow of processing for execution of the change volume list type 2.

FIG. 17 is a flow chart for executing the change volume list type 2.

In FIG. 17, it is judged at step S91 whether or not there is coincidence with the target disc ID. If the result of decision at step S91 is NO, processing transfers to step S96 and, if otherwise, to step S92.

At step S92, it is judged whether or not there is any item to be reproduced. If the result of decision at step S92 is NO, the offset is set at step S100 to return list offset (offset=return list offset) before transferring to processing of FIG. 16. If the result of decision at step S92 is YES, processing transfers to step S93 where the item is started to be reproduced. Processing then transfers to step S94.

At step S94, it is judged whether or not there is any key input made byte user. If the result of decision at step S94 is YES, processing transfers to step S102 and, if otherwise, to step S95. At step S95, it is judged whether or not reproduction is to come to a close. If the result of decision at step S95 is NO, processing reverts to step S94 and, id otherwise, to step S92.

If the result of decision at step S91 is NO, an error item is reproduced at step S96 in order to display the messege "insert next disc". After step S96, processing shifts to step S97.

At step S97, it is judged whether or not an optical disc has been exchanged. If the result of decision is YES, processing reverts to step S91. If the result of decision is NO, processing transfers to step S98.

At step S98, it is judged whether or not the cancel key has been thrust. If the result of decision at step S98 is NO, processing reverts to step S97. If the result of decision at step S98 is YES, processing transfers to step S99. At step S99, the offset is set to cancel list offset (offset=cancel list offset) to transfer to the processing of FIG. 16.

If the result of decision at step S94 is YES, it is judged at step S102 whether or not the key input is that for the next key. If the result of decision at step S102 is YES, processing transfers to step S106 and, if otherwise, processing transfers to step S103.

At step S103, it is judged whether or not the key input is the cancel key. If the result of decision at step S103 is YES, processing transfers to step S108 and, if otherwise, processing transfers to step S104.

At step S104, it is judged whether or not the key input is that for the previous key. If the result of decision at step S104 is YES, processing transfers to step S95 and, if otherwise, processing transfers to step S105.

At step S105, it is judged whether or not there is any previous item. If the result of decision is NO, processing transfers to step S95 and, if otherwise, processing transfers to step S101.

At step S101, the item currently displayed is halted before processing reverts to step S93.

If the result of decision at step S102 is YES, it is judged at step S106 whether or not there is the next item. If the result of decision at step S106 is YES, processing transfers to step S101 and, if otherwise, processing transfers to step S107.

At step S108, the offset is set to return list offset (offset= return list offset) before processing transfers to step S109.

If the result of decision at step S103 is YES, the offset is set to cancel list offset (offset=cancel list offset) before processing transfers to step S109.

At step S109, the item currently reproduced is halted. The processing then transfers to the processing of FIG. 16.

Returning to FIG. 2, showing a construction of the information reproducing apparatus of the present embodiment, hardware of the information reproducing apparatus can be constituted by annexing a MPEG chip and a RAM to the CD player. A wide variety of inexpensive players may be constituted, such as a portable radio cassette player.

Referring to FIG. 2, a variety of optical discs, such as CD-DA or CD-ROM, may be loaded on the CD deck 1, such that signals recorded on the optical disc may be read by an optical pickup of the CD deck 1. The signals read out from the CD deck 1 are transmitted to a signal processing circuit 2. The signal processing circuit 2 is operated under control of a CPU 4 for transmitting servo control signals, such as focusing control signals or tracking control signals, to the CD deck responsive to the readout signals from the optical disc, and for effecting error correction of the readout signals from the optical disc.

The playback signals for the optical disc from the signal processing circuit 2 are routed to a switching circuit 15 and to a CD-ROM decoder 3. If the optical disc is of the type of the CD-ROM, such as video CD of the present embodiment, the CD-ROM decoder 3 decodes the playback signals from the optical disc in accordance with the CD-ROM format. Of the signals decoded by the CD-ROM decoder 3, a variety of disc data, including the playback control information data, is routed to the RAM 6, while the audio data and the video data are transmitted to a MPEG audio decoder 21 and to the MPEG video decoder 22, respectively.

The MPEG audio decoder 21 decodes the audio data, based upon the format of the layer 2 of MPEG 1, while the MPEG video decoder 22 decodes the video data, based upon the MPEG1 format.

The audio signals decoded by the MPEG audio decoder 21 are routed to the switching circuit 15. The switching circuit 15 causes the audio signals from the signal processing circuit 2 or the audio signals from the MPEG audio decoder 21 to be selected when the optical disc reproduced by the CD deck 1 is the usual audio CD (CD-DA) or the optical disc of the present embodiment (video CD). The switching circuit 15 also effects switching of the audio signals between left (L) and right (R) stereo channels.

The digital audio signals via the switching circuit 15 are converted by the D/A converter 16 into analog signals which are routed via a filter 7 to an echo mixing circuit 18. The echo mixing circuit 18 mixes microphone audio input signals from a terminal 19 and audio signals via the filter 17 while applying echo to the speech input signals. That is, the echo mixing circuit 18 mixes the audio signals reproduced from the optical disc and the speech input signals from the microphone and also applies echo to the speech input signal for realizing the karaoke function.

The signals from the echo-mixing circuit 18 are routed from an output terminal 20 to downstream side devices, such as an amplifier and a speaker.

On the other hand, the video information transmitted to the MPEG video decoder 22 is decoded by the MPEG video decoder 22 and thereby turned into digital video signals which are routed to the D/A converter 23. To the video signals converted by the D/A converter 23 into analog signals is appended the character information to be displayed by a character display circuit 24 on a downstream side display device. The resulting signal is modulated by a video modulation circuit 25 so as to be transmitted at an output terminal 26 to e.g. a monitor display.

In the ROM 5 or an electrically erasable PROM (EEPROM) 7 are stored the information of various programs employed in the CPU 4 and the above character information. The CPU 4 controls various components connected via the bus using the program information and the like in order to take out the necessary information and to route the character information to a character display circuit 24.

The CPU 4 is also connected to a sub CPU 8. The sub CPU 8 is responsive to an input signal from various switches 11 and to signals from receiving unit 10 receiving IR signals from the remote controller 9 for judging these signals and the contents of these signals. The CPU is also responsive to the playback control information and the contents of the above signals to give decision as to the contents of the signals, while being responsive to the signal contents and to the control information for controlling the display on a phosphor display tube 12. The sub CPU 8 is also connected to a power source 13.

A variety of keys are arranged on the switch 11 and the remote controller 9. Examples of the keys include the next key, previous key, return key, cancel key, stop key, pause key, fast feed key, fast rewind key and a number input key. With the information reproducing apparatus of the present embodiment, the user can thrust these keys while the video CD is being automatically reproduced, so that pre-set function keys may be selected during automatic playback by thrusting these keys and hence the playback state or contents of the apparatus are changed. This permits the user to effect the playback using the above-mentioned playback control function.

That is, with the information reproducing apparatus of the present embodiment, when the next key is thrust during automatic playback, the item currently reproduced is halted and a separate item is reproduced. Similarly, when the previous key is thrust during automatic playback, the item currently reproduced is halted and a separate item is reproduced. When the cancel key is thrust during automatic playback, the item currently reproduced is halted to revert to the previous menu. However, as explained with reference to FIGS. 8 and 9, the previous menu is not necessarily the directly previous item. Similarly,if the stop key is thrust, the playback control ceases to operate to return to the initial state. If the pause key is thrust, playback is paused (transiently halted). If the pause key is thrust with the moving picture, the picture is halted, that is becomes a still picture. If the fast feed key is thrust, fast rewind playback is carried out within the currently reproduced item. During the fast feed playback, the reproduced picture is displayed as a still picture.

In addition, the information reproducing apparatus of the present embodiment supports the usual track-based shuffling or the program reproducing functions for the cases in which the playback control program is not recorded on the optical disc being reproduced, the playback control program is recorded on the optical disc but is not used, and in which the optical disc is a usual CD-DA optical disc.

In the above embodiment, the play sequence descriptor PSD includes both the play list PL and the selection list SL.

It is however possible to record a plurality of the selection lists SL only and to cause cyclic display of menu pictures.

As described above, not only the moving picture data, still picture data and the speech data, but also the CPU-non-dependent simple script stating the replay sequence or user selected branching (play sequence descriptor in the present embodiment) are recorded on the optical disc (video CD) of the present embodiment. Thus it is possible with the information reproducing apparatus of the present embodiment to set the replay sequence or branching for each optical disc. It is also possible with the information reproducing apparatus of the present embodiment to advance to the designated branch destination or to points ahead or at back of the point stated in the play sequence descriptor PSD.

That is, with the present embodiment, the optical disc playback control is made using a simplified script recorded on the optical disc. This script is not dependent on the CPU of the information recording apparatus. In addition, with the present embodiment, since a lumped aggregate of data such as the totality of the moving and still pictures, speech and the slide show, is treated as an item, access to the item can be easily had in the information recording apparatus. In addition, since the script is controlled on the item basis and the scriptor connection is assured by a pointer, such as next or previous. On the other hand, while the script causes the execution to be branched with the aid of various pointers, and the execution branching is effected responsive to the user's operations, execution is by a pre-set sequence if the operator does not perform the operations. The pointer is represented by the offset from the leading end when the script in its entirety is arrayed virtually, while the offset is represented as base size (e.g. 8 byte) unit instead of as byte unit. Thus the leading position of each script follows this unit. This is located at a boundary at every eight bytes, with the vacant space being stuffed with zeros.

Also, with the present embodiment, the script and data can be recorded together on the sole optical disc and a script of a separate volume can be addressed in association with the multi-volume. In addition, execution can be transferred to the script of the separate volume in association with the multi-volume. Since the state according to the execution sequence is not maintained, execution can be started at any script. In addition, the logical ID (list ID) can be annexed to all of the scripts. By separately providing a table of the pointers to the scripts, execution from an intermediate script becomes feasible by the logical ID. The list ID is not necessarily annexed, in which case a limitation may be imposed on execution from the script. Furthermore, by inserting at a physically specified position on the optical disc an ID indicating that the optical disc is the video CD, and by collectively recording the required information, such as the script size of the number of the list IDs, the nature of the optical disc can be identified, while the required information can be taken at a time.

As described above, with the information recording medium of the present invention, since there is recorded the playback control information made up of plural lists, at least a portion of the lists including the item information indicating one or more items reproduced based upon the list and a pointer represented by the offset from the leading end of the playback control information indicating the separate connected list, it becomes possible to have an easy access to the data specified by the user when reproducing the information recording medium of the present invention. On the other hand, since the information recording medium of the present invention has recorded thereon the information indicating the end of the playback control information, the next processing can be entered on completion of reproduction of the playback information.

In addition, since the information indicating the attributes of the playback information is recorded on the information recording medium of the present invention, playback responsive to the attributes may be achieved. Since the information concerning the table of correlation for correlating the ID codes of the respective lists with the corresponding offsets is recorded separately from the playback control information, the user can directly select an arbitrary list. On the other hand, since there is also recorded the information for exchanging and reproducing plural information recording media, the user can be apprised of the necessity for exchanging the information recording media.

Since the recorded information is not dependent on the operating system or the object code of the micro-computer provided on the information reproducing apparatus for reproducing the information recording medium, there are relatively few little hardware-related limitations.

Consequently, with the information recording medium of the present invention, data such as moving or still pictures can be recorded as data files, while there is relatively little limitation related with the hardware for reproduction and recorded data can be accessed easily by the hardware for reproduction. In addition, the information is of a small number of kinds and simple in function and hence may be formulated easily. The information is non-dependent on the micro-computer loaded on the information reproducing apparatus and imposes little limitation on the hardware.

With the information reproducing apparatus of the present invention for reproducing an information recording medium in which the playback control information has a plurality of lists recorded thereon, at least some of the lists including the item information indicating one or a plurality of items reproduced in accordance with the lists and a pointer represented by the offset from the from the leading end of the playback control information indicating a separate list connected to the lists, the playback control information reproduced from the information recording medium is stored and the playback information recorded on the information recording medium is reproduced responsive to the information selected by the commands by the user for enabling reproduction of the playback information as commanded by the user.

If, with the information reproducing apparatus of the present invention, the information indicating the attributes of the playback information is recorded on the information recording medium, playback conforming to the attributes is feasible. If the information on the table of correlation of correlating the ID codes of the lists with the corresponding offsets is recorded on the information recording medium separately from the playback control information, it becomes possible for the user to select the playback information directly responsive to the table of correlation. Also, if the information concerning exchange and reproduction of plural information recording media on the information recording medium, the user can be apprised of the necessity of exchanging the recording media.

In addition, the information non-dependent on the operating system and the object code of the micro-computer arranged on the information reproducing apparatus of the present invention is recorded on the information recording medium, and the information reproducing apparatus of the present invention can transform the information into the information correlated with the operating system and the object code of the micro-computer using the information reproduced from the information recording medium, so that it becomes possible to control the reproduction of the information recording medium.

Furthermore, since the information reproducing apparatus of the present invention has time measurement means for measuring a pre-set time interval, reproduction of the next playback information can be entered by detecting the input failure continuing for a pre-set time interval.

Consequently, the information reproducing apparatus of the present invention can be used as a data file for recording data such as pictures or speech simply by annexing a simplified structure, while data recorded on the information recording medium can be accessed easily.

We claim:

1. An information recording medium having recorded thereon:
   a plurality of items composed of at least one of video information and audio information; and
   playback control information for controlling the reproduction of the items are recorded thereon;
   wherein the playback control information is comprised of a plurality lists; and
   wherein at least one of the lists includes an item information indicating at least one item reproduced in accordance with the lists and a pointer representing an offset from a leading end of the playback control information indicating a separate list connected to the lists.

2. The information recording medium as claimed in claim 1, wherein the offset is represented with plural bytes as one unit.

3. The information recording medium as claimed in claim 1, wherein at least one of the plurality lists is a first list and the first list contains only one item information and a plurality of pointers respectively associated with a plurality of branched lists to which control can be branched responsive to a user's selection.

4. The information recording medium as claimed in claim 1, wherein:
   at least one of the plurality of lists is a second of list; and
   the second list contains a plurality of item information indicating a plurality of consecutively reproduced items.

5. The information recording medium as claimed in claim 1, wherein at least one of the plurality of lists is a third list and the third list indicates the end of interpretation of the playback control information.

6. The information recording medium as claimed in claim 1 wherein the lists which have a pointer include, as the pointer, at least one of a first pointer indicating the list to which processing is transferred responsive to selection of a first function, a second pointer indicating the list to which processing is transferred responsive to selection of a second function and a third pointer indicating the list to which processing is transferred responsive to selection of a third function.

7. The information recording medium as claimed in claim 1, the information recorded thereon further comprising:
   attribute-denoting information denoting the attributes of the each item.

8. The information recording medium as claimed in claim 1 wherein a leading end of a position of recording the playback control information is a fixed position on the recording medium.

9. The information recording medium as claimed in claim 1, the information recorded thereon further comprising:
   size information indicating the size of the playback control information.

10. The information recording medium as claimed in claim 1, wherein the playback control information is non-dependent on an operating system and an object code of a micro-computer of an information reproducing apparatus for reproducing the audio and video information.

11. The information recording medium as claimed in claim 1, wherein at least one of the lists contains information for exchanging and reproducing a plurality of information recording media.

12. The information recording medium as claimed in claim 1, wherein at least one of the plurality of lists contains information indicating a wait time following execution of one item.

13. The information recording medium as claimed in claim 1, wherein at least one of the lists contains proper identification codes, and wherein a table for correlating the identification codes and associated pointers is recorded at a position separate from that of the playback control information.

14. The information recording medium as claimed in claim 1, wherein the information recording medium is an optical disc.

15. An information reproducing apparatus for reproducing an information recording medium, the information recorded thereon comprising:
   a plurality of items composed of at least one of audio information and video information; and
   playback control information for controlling the reproduction of the items are recorded thereon;
   wherein the playback control information is comprised of a plurality of lists;
   wherein at least one of the lists includes an item information indicating at least one item reproduced in accordance with the lists and a pointer representing an offset from a leading end of the playback control information indicating a separate list connected to the lists the information reproducing apparatus comprising:
   reproducing means for reproducing the information recorded on the information recording medium;
   input means for inputting the user's selection;
   output means for outputting the audio and video information reproduced by the reproducing means; and
   control means for controlling the reproduction of the respective items by the reproducing means based upon the item information in predetermined list of the playback information reproduced by the reproducing means;
   wherein the control means causes switching of control from the predetermined list to another list based on the pointer in response to a user's selection inputted by the input means and when reproduction of all items indicated in the predetermined list comes to an end.

16. The information reproducing apparatus as claimed in claim 15, wherein the offset is represented with plural bytes as one unit.

17. The information reproducing apparatus as claimed in claim 15 comprising storage means for storing at least a portion of the playback control information reproduced by the reproducing means, and wherein the control means performs control based upon the playback control information stored in the storage means.

18. The information reproducing apparatus as claimed in claim 15 wherein, if the predetermined list is a first list containing at least one item information and a plurality of pointers respectively associated with a plurality of lists to which control is branched responsive to a user's selection, the control means switching from the predetermined list to another list based upon number information as entered by the input means.

19. The information reproducing apparatus as claimed in claim 15 wherein, if the predetermined list is a second list which contains a plurality of item information data indicating a plurality of items reproduced consecutively, the control means controls the reproducing means so that, if there is no input by the input means, the items of the list will be reproduced consecutively.

20. The information reproducing apparatus as claimed in claim 15 wherein, if the predetermined list is a third list indicating the end of interpretation of the playback control information, the control means terminates the interpretation of the playback control information.

21. The information reproducing apparatus as claimed in claim 18 wherein, the first list contains at least one of first, second and third pointers, and wherein the control means control from the predetermined first list based upon the first, second and third pointers respectively associated with first, second and third functions selected by the input means.

22. The information reproducing apparatus as claimed in claim 19 wherein, the second list contains first, second and third pointers, and wherein the control means determines if there is a next item when the first function is selected by the input means the control means controlling the playback means for reproducing the next item if there is the next item and switching control to another list based on the first pointer if there is no next item, the control means also determining if there is a previous item when the second function is selected by the input means, the control means controlling the playback means to reproduce the previous item if there is a previous item and switching control to another list based on the second pointer if there is no previous item, the control means switching control to another list based upon the third pointer when the third function is selected by the input means.

23. A recording medium having data recorded thereon, wherein the reproduction of the recording medium is controlled in accordance with lists having pointers, the recorded data comprising:

a plurality of items of audio and video data;

a first playback list including an item information which indicates an address of an item of audio and video data, and including a list pointer which indicates an address of a list;

a second playback list including an item information which indicates an address of an item of audio and video data, and including a list pointer which indicates an address of a list; and a selection list including an item information which indicates an address of an item of audio and video data, including a first playback list pointer which indicates an address of the first playback list, and including a second playback list pointer which indicates an address of the second playback list.

* * * * *